United States Patent
Mirza et al.

(10) Patent No.: US 9,846,662 B2
(45) Date of Patent: *Dec. 19, 2017

(54) CHAINED CPP COMMAND

(71) Applicant: Netronome Systems, Inc., Santa Clara, CA (US)

(72) Inventors: Salma Mirza, Woburn, MA (US); Gavin J. Stark, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 457 days.

This patent is subject to a terminal disclaimer.

(21) Appl. No.: 14/492,015

(22) Filed: Sep. 20, 2014

(65) Prior Publication Data

US 2016/0085701 A1    Mar. 24, 2016

(51) Int. Cl.
| | |
|---|---|
| *G06F 13/28* | (2006.01) |
| *G06F 12/10* | (2016.01) |
| *G06F 12/1081* | (2016.01) |
| *G06F 13/16* | (2006.01) |
| *G06F 13/40* | (2006.01) |

(52) U.S. Cl.
CPC .......... *G06F 13/28* (2013.01); *G06F 12/1081* (2013.01); *G06F 13/1642* (2013.01); *G06F 13/4027* (2013.01)

(58) Field of Classification Search
CPC .. G06F 12/0835; G06F 12/10; G06F 12/1081; G06F 13/28; G06F 3/0659; G06F 13/1642; G06F 13/4027
See application file for complete search history.

(56) References Cited

U.S. PATENT DOCUMENTS

| | | | | |
|---|---|---|---|---|
| 6,728,791 | B1 * | 4/2004 | Young | G06F 11/2087 710/1 |
| 7,287,101 | B2 * | 10/2007 | Futral | G06F 13/28 710/22 |
| 2006/0230211 | A1 * | 10/2006 | Woodral | G06F 13/423 710/302 |
| 2008/0065794 | A1 * | 3/2008 | Lee | G06F 13/28 710/24 |

(Continued)

OTHER PUBLICATIONS

Tanenbaum, Andrew S. "Structured Computer Organization". Third Edition. 1990. Prentice-Hall, Inc. ISBN 0-13-854662-2. p. 11.*

(Continued)

*Primary Examiner* — Thomas J Cleary
(74) *Attorney, Agent, or Firm* — Imperium Patent Works LLP; T. Lester Wallace; Mark D. Marrello

(57) ABSTRACT

A chained Command/Push/Pull (CPP) bus command is output by a first device and is sent from a CPP bus master interface across a set of command conductors of a CPP bus to a second device. The chained CPP command includes a reference value. The second device decodes the command, in response determines a plurality of CPP commands, and outputs the plurality of CPP commands onto the CPP bus. The second device detects when the plurality of CPP commands have been completed, and in response returns the reference value back to the CPP bus master interface of the first device via a set of data conductors of the CPP bus. The reference value indicates to the first device that an overall operation of the chained CPP command has been completed.

20 Claims, 27 Drawing Sheets

MERGE COMMAND OPERATION

(56) References Cited

U.S. PATENT DOCUMENTS

| | | | |
|---|---|---|---|
| 2010/0191874 A1* | 7/2010 | Feeley | G06F 13/385 710/24 |
| 2012/0233504 A1* | 9/2012 | Patil | G06F 11/2242 714/30 |
| 2013/0086586 A1* | 4/2013 | Lakshmanamurthy | G06F 15/7864 718/100 |
| 2013/0215893 A1* | 8/2013 | Stark | H04L 12/6418 370/392 |
| 2014/0281098 A1* | 9/2014 | Hellwig | G06F 13/28 710/308 |
| 2016/0085477 A1* | 3/2016 | Mirza | G06F 3/0647 711/165 |

OTHER PUBLICATIONS

Wallace, Hank. "Using State Machines in Your Designs". Atlantic Quality Design, Inc. R&D Services. Online 2003. Retrieved from Internet Dec. 8, 2016. <http://aqdi.com/articles/using-state-machines-in-your-desings-3>.*

* cited by examiner

MERGE COMMAND OPERATION

MERGE COMMAND OPERATION

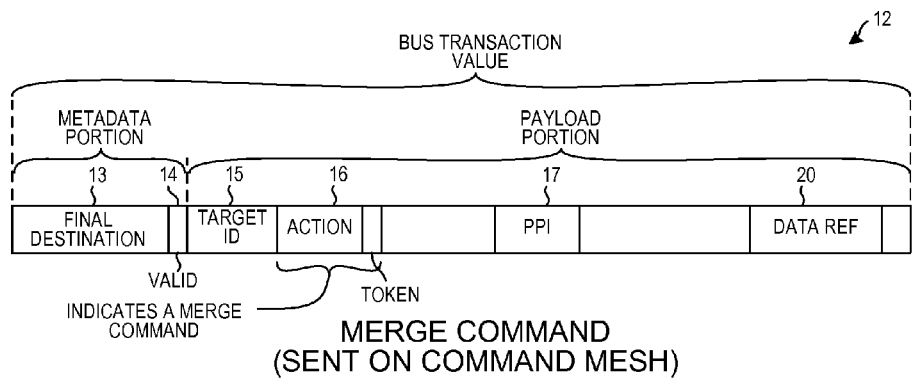

MERGE COMMAND
(SENT ON COMMAND MESH)

FIG. 3

| FIELD | WIDTH | DESCRIPTION |
|---|---|---|
| FINAL DESTINATION | 6 | DESTINATION ISLAND TO WHICH THE MERGE COMMAND IS GOING. |
| VALID | 1 | |
| TARGET | 4 | CTM TARGET ID (ID OF THE CTM TO WHICH THE MERGE COMMAND IS GOING.) |
| ACTION | 5 | "10101" = MERGE COMMAND. |
| TOKEN | 2 | [1:1]: 0 = DON'T FREE, 1 = FREE. |
| | | [1;0]: 0 = DON'T BYTE SWAP, 1 = BYTE SWAP. |
| LENGTH | 5 | [5;0] UNUSED |
| ADDRESS | 40 | [1;16]: UNUSED |
| | | [1;15]: POLL (IF DMA QUEUE IS FULL - PUSH BACK ERROR RESPONSE) |
| | | [6;9]: UNUSED |
| | | [9;0]: PPI (PACKET PORTION IDENTIFIER) |
| BYTE MASK | 8 | UNUSED |
| DATA MASTER ISLAND | 6 | ISLAND OF THE MASTER OF THE MERGE COMMAND. |
| MASTER ID | 4 | MASTER ID OF THE MASTER OF THE MERGE COMMAND. |
| DATA REF | 14 | DATA REF TO RETURN TO MASTER TO INDICATE MERGE COMMAND COMPLETION. |
| SIGNAL MASTER | 8 | SIGNAL MASTER |
| SIGNAL REF | 7 | SIGNAL REF |

MERGE COMMAND

FIG. 4

WRITE COMMAND
(SENT ON THE COMMAND MESH)

PULL-ID BUS TRANSACTION VALUE
(SENT ON THE PULL-ID MESH)

RETURN OF DATA REF OF A MERGE COMMAND
(SENT BACK ON THE DATA MESH)

INGRESS MAC ISLAND

ONE SERDES CIRCUIT

| WIDTH | DESCRIPTION |
|---|---|
| 6-BITS | BUFFER POOL NUMBER TO USE |
| 32-BITS | SEQUENCE NUMBER IN A FLOW (USABLE TO ORDER PACKETS TO BE SENT OUT IB-NFP) |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

PRECLASSIFICATION RESULTS

| WIDTH | DESCRIPTION |
|---|---|
| 32-BITS | ADDRESS INFO INDICATING WHERE THE HEADER PORTION IS STORED. |
| 32-BITS | ADDRESS INFO INDICATING WHERE THE PAYLOAD PORTION IS STORED. |
| 16-BITS | PACKET LENGTH. |
| 32-BITS | SEQUENCE NUMBER OF THE PACKET. |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

INGRESS PACKET DESCRIPTOR

FIG. 13

| WIDTH | DESCRIPTION |
|---|---|
| 32-BITS | ADDRESS INFO INDICATING WHERE THE HEADER PORTION IS STORED. |
| 32-BITS | ADDRESS INFO INDICATING WHERE THE PAYLOAD PORTION IS STORED. |
| 16-BITS | PACKET LENGTH. |
| 32-BITS | SEQUENCE NUMBER OF THE PACKET. |
| 16-BITS | QUEUE NUMBER: QUEUE TO WHICH THE PACKET BELONGS. ("QUEUE INDICATOR") |
| 8-BITS | I/O DESTINATION TO WHICH THE PACKET IS TO BE SENT. |
| 5-BITS | PACKET SEQUENCER IDENTIFICATION |

EGRESS PACKET DESCRIPTOR

FIG. 15

ME ISLAND

MU ISLAND

EGRESS MAC ISLAND

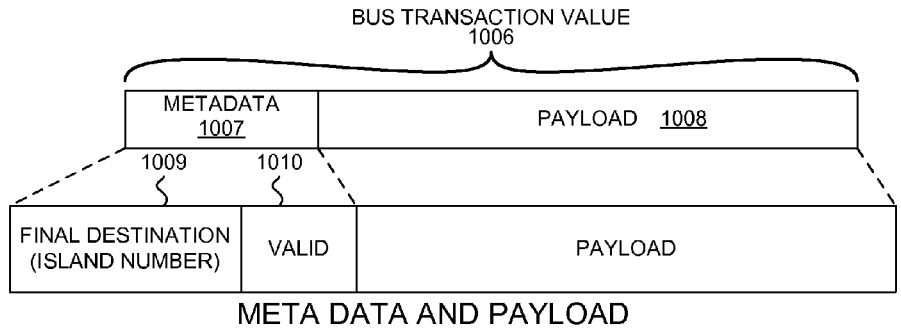

META DATA AND PAYLOAD

FIG. 20

| FIELD | WIDTH | DESCRIPTION |
|---|---|---|
| TARGET | 4 | CPP TARGET FOR THE COMMAND. |
| ACTION | 5 | ACTION RECOGNIZED BY THE CPP TARGET INDICATING WHAT SHOULD BE PERFORMED. |
| TOKEN | 2 | SUBTYPE OF ACTION RECOGNIZED BY THE CPP TARGET, INDICATING THE FLAVOR OF THE COMMAND. |
| LENGTH | 5 | LENGTH OF THE COMMAND, DEPENDENT ON THE ACTION/TOKEN, INTERPRETED BY THE CPP TARGET. |
| ADDRESS | 40 | ADDRESS THAT THE COMMAND SHOULD OPERATE ON. |
| BYTE_MASK | 8 | FURTHER OPTIONS OF A COMMAND (A BYTE MASK). |
| DATA_MASTER_ISLAND | 6 | ISLAND OF DATA MASTER. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM. |
| SIGNAL_MASTER | 10 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED FOR THE COMMAND. |
| SIGNAL_REF | 7 | REFERENCE WITHIN THE SIGNAL MASTER AS TO WHEN SIGNAL SHOULD BE INDICATED WITH THE COMMANDS PULL OR PUSH. |

COMMAND PAYLOAD

FIG. 21

| FIELD | WIDTH | DESCRIPTION |
|---|---|---|
| TARGET_ISLAND | 6 | ISLAND TO RETURN PULL DATA TO. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE; RETURNED WITH PULL DATA. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM; NORMALLY COPIED FROM THE INVOKING COMMAND. |
| SIGNAL_MASTER | 8 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED WHEN THE LAST DATA IS PULLED. |
| SIGNAL_REF | 7 | REFERENCE USABLE BY THE MASTER TO DETERMINE WHICH SIGNAL SHOULD BE INDICATED WITH THE LAST PULL DATA. |
| LENGTH | 5 | NUMBER OF 64-BIT DATA WORDS TO PULL FROM THE DATA MASTER, STARTING AT THE SPECIFIED DATA_REF. |

PULL-ID PAYLOAD

FIG. 22

| FIELD | WIDTH | DESCRIPTION |
|---|---|---|
| DATA_IS_PULL | 1 | ASSERTED FOR PULL DATA. |
| DATA_MASTER_OR_TARGET_PORT | 4 | DATA MASTER FOR PUSH DATA OR TARGET PORT FOR PULL DATA. |
| DATA_OR_TARGET_REF | 14 | DATA REF FOR PUSH DATA OR TARGET REF FOR PULL DATA. |
| SIGNAL_MASTER | 8 | ONLY USED FOR PUSH DATA; MASTER IN ISLAND TO SIGNAL IF DATA_MASTER IS NOT CTM; EXTENSION OF DATA_REF FOR DATA_MASTER OF CTM. |
| SIGNAL_REF_OR_CYCLE | 7 | SIGNAL_REF FOR PUSH DATA OR CYCLE FOR PULL DATA. |
| LAST | 1 | ASSERTED WITH THE LAST WORD OF DATA FOR PULL OR PUSH DATA. |
| DATA | 64 | 64-BITS OF PULL/PUSH DATA. |
| DATA_ERROR | 2 | ONE BIT PER 32-BITS OF DATA TO INDICATE AN UNCORRECTABLE ERROR. |
| DATA_VALID | 2 | ONE BIT PER 32-BITS OF DATA TO INDICATE, ON PUSH, THAT THE DATA IS TO BE WRITTEN TO THE DATA_MASTER. |
| NO_SPLIT | 1 | FOR PUSH DATA ONLY, ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD

FIG. 23

| FIELD | WIDTH | DESCRIPTION |
| --- | --- | --- |
| DATA_IS_PULL | 1 | ASSERTED FOR PULL DATA. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE, RETURNED WITH PULL DATA. |
| CYCLE-OF_PULL | 7 | CYCLE OF PULL DATA. |
| LAST | 1 | ASSERTED WITH THE LAST WORD OF PULL DATA. |
| DATA | 64 | 64-BITS OF PULLED DATA FROM THE DATA MASTER. |
| DATA_ERROR | 2 | ONE BIT PER 32-BITS OF PULLED DATA TO INDICATE AN UNCORRECTABLE ERROR FROM THE DATA_MASTER DATA SOURCE. |

DATA PAYLOAD (FOR A PULL)

FIG. 24

| FIELD | WIDTH | DESCRIPTION |
| --- | --- | --- |
| DATA_IS_PULL | 1 | DEASSERTED FOR PUSH DATA. |
| DATA_MASTER | 4 | PUSH ID WITHIN THE ISLAND OF DATA MASTER THE DATA IS DESTINED FOR. |
| DATA_REF | 14 | REFERENCE WITHIN DATA MASTER AS TO WHERE TO PUSH FROM. |
| SIGNAL_MASTER | 8 | FOR CTM AS A DATA MASTER ONLY THIS IS AN EXTENSION FOR DATA_REF; FOR OTHER MASTERS INDICATING WHICH MASTER WITHIN THE DATA MASTER'S ISLAND SHOULD BE SIGNALED WHEN THE LAST DATA IS PUSHED. |
| SIGNAL_REF | 7 | REFERENCE WITHIN THE SIGNAL MASTER AS TO WHICH SIGNAL SHOULD BE INDICATED WITH THE LAST PUSH DATA. |
| LAST | 1 | ASSERTED WITH THE LAST WORD OF PUSH DATA. |
| DATA | 64 | 64-BITS OF PUSH DATA FROM THE DATA MASTER. |
| DATA_ERROR | 2 | ONE BIT PER 32-BITS OF PUSHED DATA TO INDICATE AN UNCORRECTABLE ERROR FROM THE DATA_MASTER DATA SOURCE. |
| DATA_VALID | 2 | ONE BIT PER 32-BITS OF DATA TO INDICATE THAT THE DATA IS TO BE WRITTEN TO THE DATA_MASTER. |
| NO_SPLIT | 1 | ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD (FOR A PUSH)

FIG. 25

CLUSTER TARGET MEMORY

| PACKET PORTION IDENTIFIER (PPI) (9 BITS) | VALID (PPI IS BEING USED) (1 BIT) 1 = IN USE 0 = AVAIL FOR ALLOCATION | THE OWNER OF THE PPI (2 BITS) 00 = AN ME 01 = NBI-0 10 = NBI-1 | SIZE OF THE PACKET PORTION IDENTIFIED BY THE PPI (2 BITS) 00 = 256B 01 = 512B 10 = 1KB 11 = 2KB | STARTING ADDRESS IN MEMORY WHERE THE PACKET PORTION IS STORED (10 BITS) | FIRST SEGMENT RCVD | LAST SEGMENT RCVD | SENT TO ME |
|---|---|---|---|---|---|---|---|
| 0 0000 0000  (0) | 0 | 01 | 01 | 00 0000 0000 | 0 | 0 | 0 |
| 0 0000 0001  (1) | 0 | 01 | 01 | 00 0000 0000 | 0 | 0 | 0 |
| 0 0000 0010  (2) | 0 | 01 | 01 | 00 0000 0000 | 0 | 0 | 0 |
| 0 0000 0011  (3) | 0 | 01 | 01 | 00 0000 0000 | 0 | 0 | 0 |
| 0 0000 0100  (4) | 0 | 01 | 01 | 00 0000 0000 | 0 | 0 | 0 |
| ⋮ | ⋮ | ⋮ | ⋮ | ⋮ | ⋮ | ⋮ | ⋮ |
| 1 1111 1111  (511) | 0 | 01 | 01 | 00 0000 0000 | 0 | 0 | 0 |

PPI ALLOCATION TABLE CIRCUIT

FIG. 28

MEMORY ALLOCATION TABLE CIRCUIT

FIG. 29

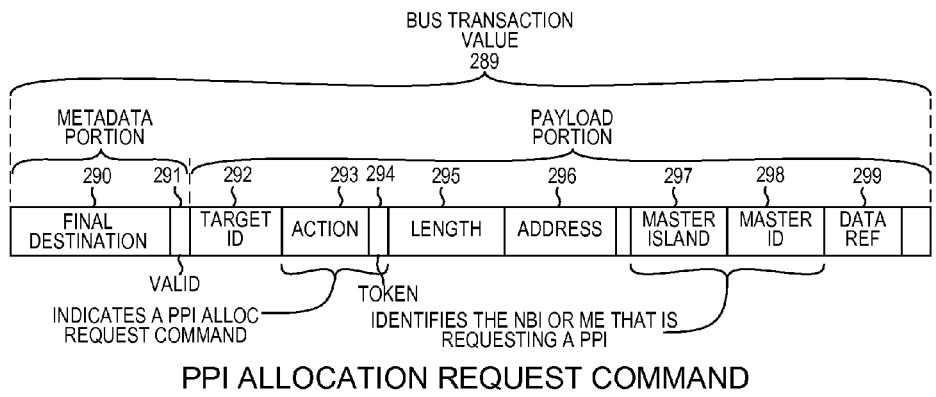

PPI ALLOCATION REQUEST COMMAND

FIG. 30

| FIELD | WIDTH | DESCRIPTION |
|---|---|---|
| FINAL DESTINATION | 6 | DESTINATION ISLAND TO WHICH THE PPI ALOC REQUEST IS GOING. |
| VALID | 1 | |
| TARGET | 4 | CTM TARGET ID (ID OF THE CTM TO WHICH THE PPI ALLOC REQUEST IS GOING.) |
| ACTION | 5 | "10001" = PPI ALLOCATION REQUEST. |
| TOKEN | 2 | "00" = PPI ALLOCATION REQUEST. |
| LENGTH | 5 | [2;0] = LENGTH OF THE PACKET PORTION.<br>"00" = 256B<br>"01" = 512B<br>"10" = 1KB<br>"11" = 2KB |
| ADDRESS | 40 | [38;2] DON'T CARE. |
| | | [2;0] INDICATES THE ORIGINATOR OF PPI ALLOCATION REQUEST.<br>00 = ME<br>01 = NBI-0<br>10 = NBI-1 |
| BYTE MASK | 8 | DON'T CARE |
| DATA MASTER ISLAND | 6 | ISLAND OF THE REQUESTING INGRESS NBI/ME. |
| MASTER ID | 4 | MASTER ID OF THE REQUESTING INGRESS NBI/ME. |
| DATA REF | 14 | DATA REF OF THE REQUESTING INGRESS NBI/ME. |
| SIGNAL MASTER | 8 | SIGNAL MASTER |
| SIGNAL REF | 7 | SIGNAL REF |

PPI ALLOCATION REQUEST COMMAND

FIG. 31

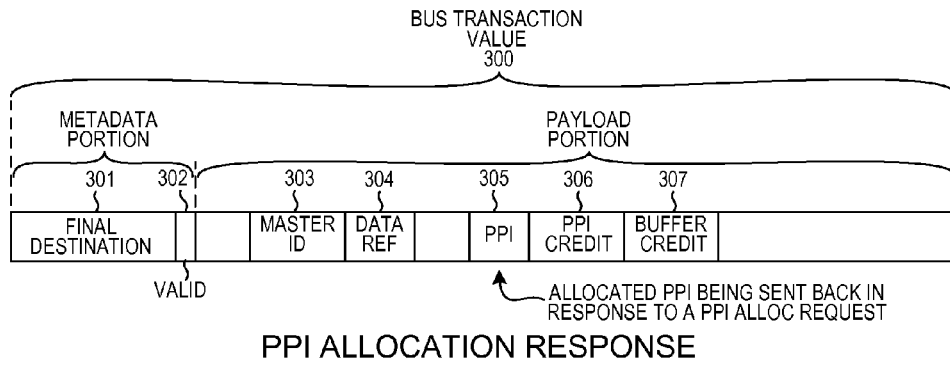

PPI ALLOCATION RESPONSE

FIG. 32

| FIELD | WIDTH | DESCRIPTION |
|---|---|---|
| DESTINATION | 6 | DESTINATION ISLAND TO WHICH THE PPI ALOC RESPONSE IS GOING. |
| VALID | 1 | DEASSERTED BECAUSE THIS IS A PUSH. |
| DATA IS PULL | 1 | DE-ASSERTED, INDICATES A PUSH. |
| DATA MASTER | 4 | MASTER ID OF THE INGRESS NBI/ME TO RECEIVE THE RESPONSE. |
| DATA REF | 14 | DATA REF (COPIED FROM TARGET COMMAND). |
| SIGNAL MASTER | 8 | SIGNAL MASTER (COPIED FROM TARGET COMMAND). |
| SIGNAL REF | 7 | SIGNAL REF (COPIED FROM TARGET COMMAND). |
| LAST | 1 | 1 |
| DATA | 64 | [32;32] = UNUSED.<br>[2;30] = 0<br>[1;29] = 0<br>[9;20] = _PPI THAT WAS ALLOCATED (9-BITS)_<br>[11;9] = PPI CREDITS BEING RETURNED.<br>[9;0] = BUFFER CREDIT BEING RETURNED. |
| DATA | 64 | [44;20] = UNUSED.<br>[11;9] = PPI CREDITS BEING RETURNED.<br>[9;0] = BUFFER CREDITS BEING RETURNED. |
| DATA | 64 | [32;32] = UNUSED.<br>[32;0] = 0x_FFFF_FFFF. |
| DATA | 64 | [32;32] = UNUSED.<br>[32;0] = 0x_FFFF_FFFF. |
| DATA ERROR | 2 | 0 |
| DATA VALID | 2 | 2b01 |
| NO SPLIT | 1 | 0 |

PPI ALLOCATION RESPONSE

FIG. 33

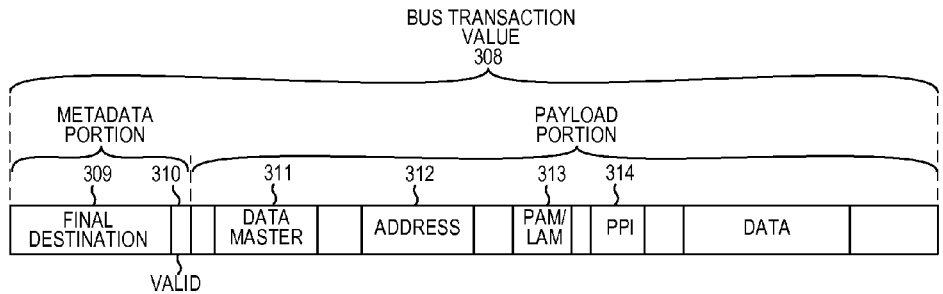

BUS TRANSACTION VALUE TO TRANSFER PACKET DATA USING EITHER PPI ADDRESSING MODE (PAM) OR ORDINARY LINEAR ADDRESSING MODE (LAM)

FIG. 34

| FIELD | WIDTH | DESCRIPTION |
|---|---|---|
| FINAL DESTINATION | 6 | DESTINATION ISLAND TO WHICH THE DATA IS BEING TRANSFERRED. |
| VALID | 1 | |
| DATA IS PULL | 1 | DE-ASSERTED SINCE THIS IS A PUSH. |
| DATA MASTER | 4 | CTM CPP MASTER ID (OF THE CTM TO WHICH THE DATA IS BEING SENT). |
| DATA REF | 14 | TRANSFER TYPE, PPI, AND ADDRESS.<br>[3;12] = RESERVED.<br>[1;11] = PPI (*NINETH BIT OF THE PPI*) IF PAM IS USED.<br>[8;3] = ADDRESS (2KB AT 8B OFFSET) IF LAM IS USED.<br>[2;1] = RESERVED.<br>[1;0] = TRANSFER TYPE (PAM/LAM)<br>00 = LINEAR ADDRESS MODE (LAM)<br>01 = PPI ADDRESSING MODE MODE (PAM) |
| SIGNAL MASTER | 8 | PPI (*THE FIRST EIGHT BITS OF THE PPI*) IF PAM IS USED. |
| SIGNAL REF | 7 | EVEN INDICATES FIRST OR CONTINUE PACKET.<br>ODD INDICATES LAST SEGMENT OF PACKET. |
| LAST | 1 | ASSERTED WHEN THIS IS THE LAST PUSH DATA WORD. |
| DATA | 64 | THE PACKET DATA BEING TRANSFERRED. |
| DATA ERROR | 2 | ... |
| DATA VALID | 2 | X1=SIGNAL ONLY CYCLE      DATA VALID<br>X0 = TRANSFERRING DATA |
| NO SPLIT | 1 | IF ASSERTED INDICATES THAT THE SEGMENT IS BOTH FIRST AND LAST (SIGNAL REF AND SIGNAL REF1) |

BUS TRANSACTION VALUE TO TRANSFER PACKET DATA USING EITHER PPI ADDRESSING MODE (PAM) OR ORDINARY LINEAR ADDRESSING MODE (LAM)

FIG. 35

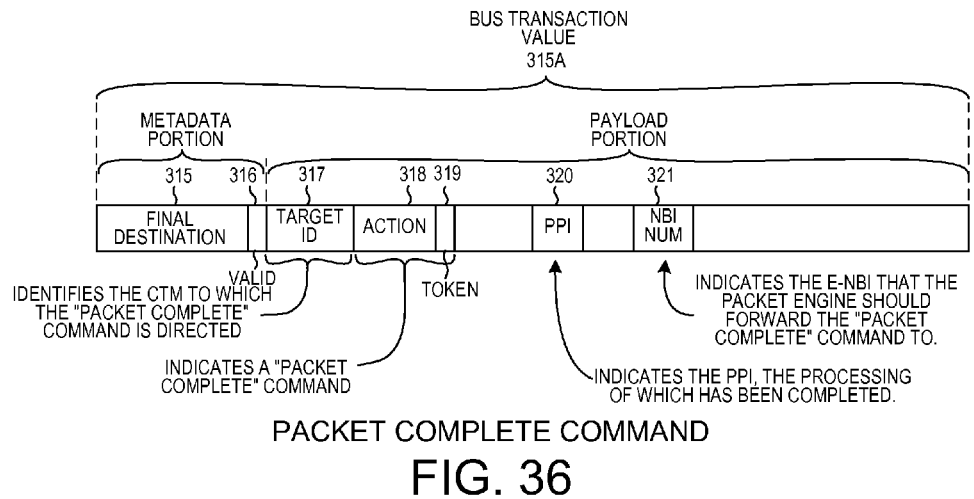

PACKET COMPLETE COMMAND

FIG. 36

| FIELD | WIDTH | DESCRIPTION |
|---|---|---|
| FINAL DESTINATION | 6 | DESTINATION ISLAND TO WHICH THE "PACKET COMPLETE" COMMAND IS GOING. |
| VALID | 1 | |
| TARGET | 4 | CTM TARGET ID (CTM TO WHICH THE "PPI DE-ALLOCATE" COMMAND IS GOING.) |
| ACTION | 5 | "10011" = PACKET COMPLETE COMMAND. |
| TOKEN | 2 | "XX" (DON'T CARE). |
| LENGTH | 5 | |
| BYTE MASK | 8 | [3;5] = DROP PRECEDENCE. <br> [5;0] = SEQUENCE NUMBER. |
| ADDRESS | 40 | [9;16] PPI OF THE PACKET PORTION THAT WAS COMPLETED. |
| DATA MASTER ISLAND | 6 | [2;4] = TOP TWO BITS OF PACKET START OFFSET. <br> [4;0] = SEQUENCE NUMBER 4;8]. |
| MASTER ID | 4 | [4;0] = SEQUENCE NUMBER [4;4]. |
| DATA REF | 14 | [2;12] = NBI NUMBER OF THE E-NBI THAT THE PACKET ENGINE SHOULD FORWARD THE "PACKET COMPLETE" COMMAND TO. <br> [1;11] = 0 = PM ENABLED, 1=PM DISABLED. <br> [1;10] = INDICATES A RETRY PACKET. <br> [10;0] = TX QUEUE NUMBER. |
| SIGNAL MASTER | 8 | DON'T CARE. |
| SIGNAL REF | 7 | UNUSED. |

PACKET COMPLETE COMMAND

FIG. 37

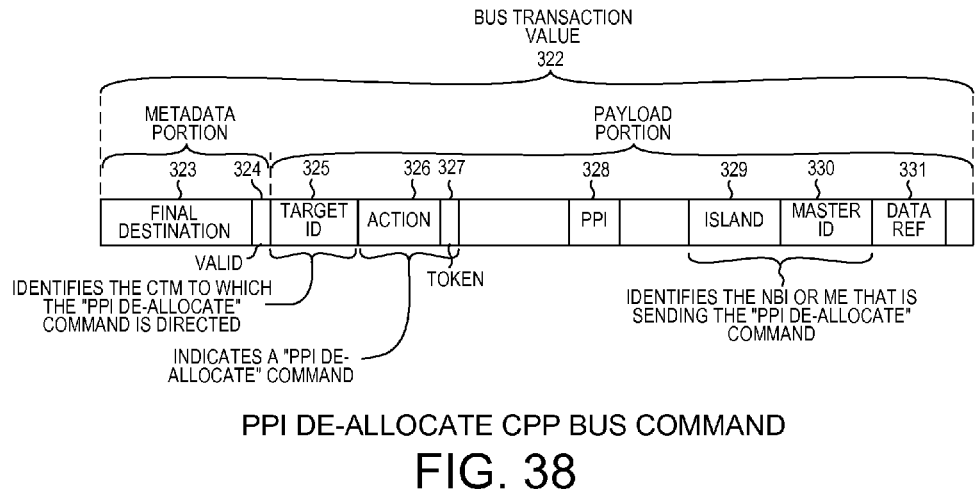

PPI DE-ALLOCATE CPP BUS COMMAND

FIG. 38

| FIELD | WIDTH | DESCRIPTION |
|---|---|---|
| FINAL DESTINATION | 6 | DESTINATION ISLAND TO WHICH THE "PPI DE-ALLOCATE" COMMAND IS GOING. |
| VALID | 1 | |
| TARGET | 4 | TARGET ID (ID OF CTM TO WHICH THE "PPI DE-ALLOCATE" COMMAND IS GOING.) |
| ACTION | 5 | "10010" = PPI DE-ALLOCATE COMMAND. |
| TOKEN | 2 | "00" = PPI DE-ALLOCATE COMMAND. |
| LENGTH | 5 | [5:0] = 5b0 |
| ADDRESS | 40 | [31;9] DON'T CARE. [9;0] THE PPI TO BE DE-ALLOCATED. |
| BYTE MASK | 8 | DON'T CARE |
| DATA MASTER ISLAND | 6 | ISLAND OF THE REQUESTING NBI OR ME THAT IS SENDING THE COMMAND. |
| MASTER ID | 4 | MASTER ID OF THE REQUESTING NBI OR ME THAT IS SENDING THE COMMAND. |
| DATA REF | 14 | DATA REF FOR THE TRANSFER. |
| SIGNAL MASTER | 8 | SIGNAL MASTER |
| SIGNAL REF | 7 | SIGNAL REF |

PPI DE-ALLOCATE CPP BUS COMMAND

FIG. 39

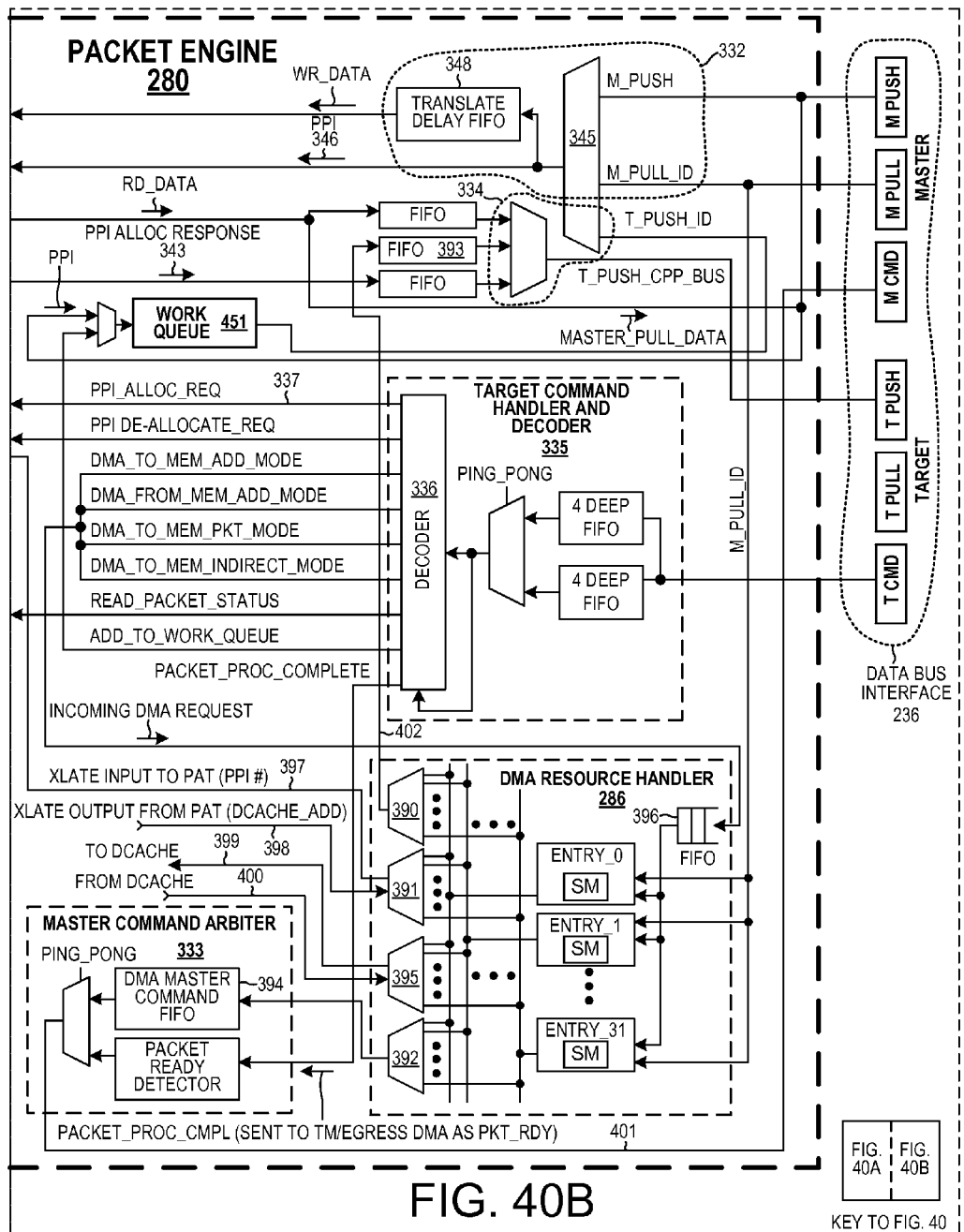

FIND FIRST IN A SLICE CIRCUIT OF THE
MEMORY ALLOCATION TABLE

STATE DIAGRAM FOR THE STATE MACHINE IN AN ENTRY OF THE DMA RESOURCE HANDLER

CHAINED CPP COMMAND

TECHNICAL FIELD

The described embodiments relate generally to Command/Push/Pull (CPP) buses, and more particularly to methods and circuits for efficiently merging parts of an item of data using a CPP bus so that the parts are then stored in a single place in memory.

BACKGROUND INFORMATION

A large integrated packet processing device such as a network flow processor integrated circuit may receive a packet, and store a first part of the packet (for example, the header) in a first memory on the integrated circuit, and store a second part of the packet (for example, the payload) in a second memory. Most analysis and decision-making is done on the header portion of the packet, so the second part of the packet may often times be advantageously stored in external memory. When a decision is made to output the packet from the network flow processor integrated circuit, the first part of the packet (the header) can be moved to an egress processing circuit. Similarly, the second part of the packet (the payload) may be moved from external memory to the egress processing circuit. The combined packet can then be output from the network flow processor integrated circuit. If, however, the packet is to be transmitted through the network flow processor in a faster fashion, then the payload is stored in another on-chip memory rather than in external memory. When the packet is to be output from the integrated circuit, the first and second parts of the packet are read from the on-chip memories that stored them, and the first and second parts are combined in the egress processing circuit, and are output from the integrated circuit. In other situations, it may be advantageous to store the various parts of the packet in other ways and places. Techniques and circuits are sought for facilitating the efficient receiving, splitting, storing, processing, reassembling, and outputting of such packets.

SUMMARY

In a first novel aspect, an addressless merge command includes an "identifier" of an item of data and a reference value, but no address. A first part of the item of data, along with a descriptor, is stored in a first place, such as in a first memory. The descriptor may be considered to be a part of the first part or the descriptor may be considered to be an amount of data different from the first part, but in any event the first part and the descriptor are stored in association with one another in the first memory. The descriptor is usually stored so that it either immediately precedes or to immediately follows the first part in the first place. There is also a second part of the item of data. The second part of the item of data is stored in a second place, such as in a second memory. More particularly, multiple such second parts are stored in the second memory in such a way that between each adjacent pair of second parts there is an amount of vacant memory space that is of a size just large enough to store a first part and the associated descriptor. To move the first part of an item so that the first and second parts are merged and stored together in the second place, the novel addressless merge command is sent across a bus to a device. The device is a device that allocates "identifiers" to items of data, that stores a first address value ADR1 for each allocated identifier, and that de-allocates identifiers. The device includes no processor that fetches and executes any processor-executable instructions, but rather the device is a small and compact dedicated amount of logic circuitry that is provided as a bus-accessible resource.

In response to receiving the addressless merge command, the device translates the "identifier" of the merge command into its corresponding first address ADR1. The device then uses the first address ADR1 to read the first part of the item of data out from the first place (for example, out of the first memory). Stored in or with the first part is a second address ADR2. The second address ADR2 may, for example, be a predetermined number of bits that is stored starting at a predetermined bit position within the descriptor, where the beginning of the descriptor is in turn located at a predetermined offset with respect to the memory location pointed to by ADR1, so that once ADR1 is known then ADR2 can be found. The second address ADR2 is the address of the memory location where the beginning of the second part is stored in the second place (for example, in the second memory). From the first part of the item of data (or from the descriptor if the descriptor is considered to be different from the first part), the device extracts the second address ADR2.

Once the device has ADR1 and ADR2, the device then uses these addresses ADR1 and ADR2 to issue a set of bus commands. Each bus command causes a different piece of the first part of the item of data to be moved across the bus, so that the first part of the item of data is moved across the bus, piece by piece. In this way, the first part is moved so that it is stored into the vacant memory space at the beginning of the second part in the second place (for example, in the second memory). When the entire first part has been moved so that the first and second parts of the item of data have been merged and reside together in the second place, then device returns the reference value across the bus back to the device that issued the addressless merge command. The reference value indicates to this originating device that the merge command operation has been completed.

In some examples where the descriptor is considered to be a part of the first part, the first and second parts are stored so that they are immediately adjacent one another in the second memory. In other examples, where the descriptor is considered to be something different from the first part, the merged storing occurs such that the descriptor is stored between the first and second parts, with all of the first part, the descriptor, and the second part being stored in contiguous memory locations. In other examples, the merged storing occurs such that the descriptor is stored in the second memory at the beginning of the first part, or immediately preceding the first part. Although the device is advantageously used to merge an item of data so that the item ends up in external memory, the device is a general purpose bus-accessible resource device that can equally be used to merge an item so that the item ends up in another programmable place, such as in an internal memory. The item can be a packet, or another item of data. The entity that initially sets up the first part of the item as it is stored in the first memory can control where the merged item will ultimately end up (as a result of the merge command) by specifying the second address ADR2 in the descriptor that it then stores in along with, or as part of, the first part of the item.

In a second novel aspect, a chained Command/Push/Pull (CPP) bus command is output by a first device and is sent from a CPP bus master interface of the first device across a set of command conductors of a CPP bus to a CPP bus target interface of a second device. The chained CPP command includes a reference value. The reference value is not an address, but rather is a flag value. The second device decodes the CPP command, in response determines a plurality of CPP commands, and outputs the plurality of CPP commands onto the CPP bus one by one. The second device detects when the last of the plurality of CPP commands has been completed, and in response returns the reference value back to the CPP bus master interface of the first device via a set of data conductors of the CPP bus. The reference value indicates to the first device that an overall operation of the chained CPP command has been completed.

Of importance, the return of the reference value (via the data conductors of the CPP bus) to signal an association with a previously issued CPP command (issued across the command conductors of the CPP bus) comports with the CPP protocol of the CPP bus as used by other devices to issue and receive other standard CPP commands. Although the CPP commands of the plurality of chained CPP commands in one illustrative example are CPP write commands that serve to move a first part of an item of data piece by piece, as described above, this is but one example. A second device in accordance with this second novel aspect can be realized so that the chained CPP commands carry out another desired high-level overall operation that is accomplished by carrying out a sequence of discrete CPP commands. In one specific example, the second device can receive and carry out more than one type of chained CPP bus command, where the particular set of chained CPP commands performed by each different type of CPP command is different. Each different type of chained CPP command is distinguishable from the others by virtue of each different type of CPP command having a unique identifying value in a subfield of its initial command CPP bus transaction value.

Further details and embodiments and methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 is a diagram that sets forth the various parts of the addressless merge command involved in the method of FIG. 1.

FIG. 4 is a table that sets forth the various fields of the addressless merge command of FIG. 3.

FIG. 13 is a table that sets forth the various components of the ingress packet descriptor as output by the ingress NBI island of FIG. 11.

FIG. 15 is a table that sets forth the various components of an egress packet descriptor.

FIG. 20 is a diagram of a CPP bus transaction value.

FIG. 21 is a table that sets forth the various fields in a command payload of a CPP bus command.

FIG. 22 is a table that sets forth the various fields in a pull-id payload of a CPP bus transaction.

FIG. 23 is a table that sets forth the various fields in a data payload of a CPP bus transaction.

FIG. 24 is a table that sets forth the various fields of a CPP data payload in the case of a pull.

FIG. 25 is a table that sets forth the various fields of a CPP data payload in the case of a push.

FIG. 28 is a diagram that illustrates an operation of the PPI Allocation Table circuit (PAT) in the packet engine of the CTM of FIG. 27.

FIG. 29 is a diagram that illustrates an operation of the Memory Allocation Table circuit (MAT) in the packet engine of the CTM of FIG. 27.

FIG. 30 is a diagram that sets forth various fields of a PPI allocation request command.

FIG. 31 is a table that sets forth the various fields of the PPI allocation request command of FIG. 30.

FIG. 32 is a diagram that sets forth various fields of a PPI allocation response bus transaction value.

FIG. 33 is a table that sets forth the various fields of the PPI allocation response of FIG. 32.

FIG. 34 is a diagram that sets forth various fields of a CPP bus transaction value that has a PAM/LAM selection bit.

FIG. 35 is a table that sets forth various fields of the CPP bus transaction value of FIG. 34.

FIG. 36 is a diagram that sets forth various fields of a packet complete CPP command.

FIG. 37 is a table that sets forth the various fields of the packet complete CPP command of FIG. 36.

FIG. 38 is a diagram that sets forth various fields of a PPI de-allocate CPP command.

FIG. 39 is a table that sets forth the various fields of the PPI de-allocate CPP command of FIG. 38.

FIG. 40 is a block diagram of the packet engine in the CTM of FIG. 27.

FIG. 40B is a part of the larger FIG. 40.

DETAILED DESCRIPTION

Reference will now be made in detail to background examples and some embodiments of the invention, examples of which are illustrated in the accompanying drawings.

Figure 1:
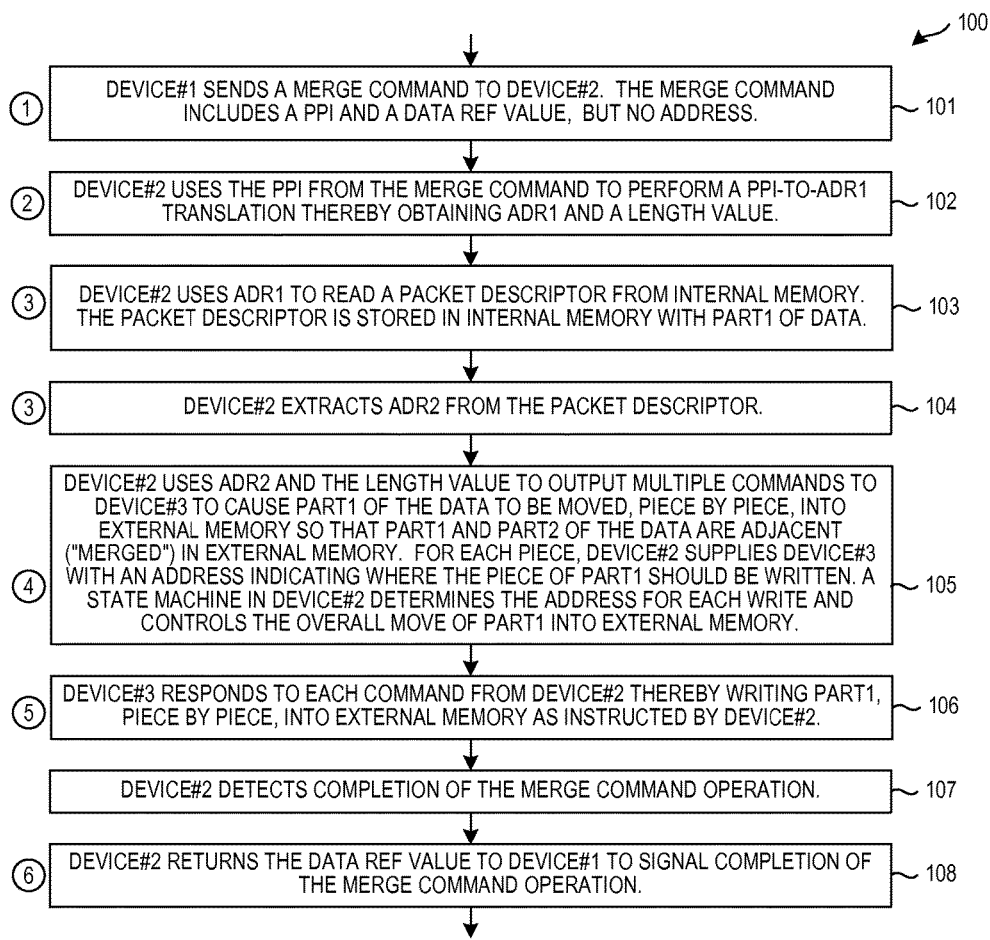
FIG. 1 is a flowchart of a method involving an addressless merge command in accordance with one novel aspect.
Figure 2:
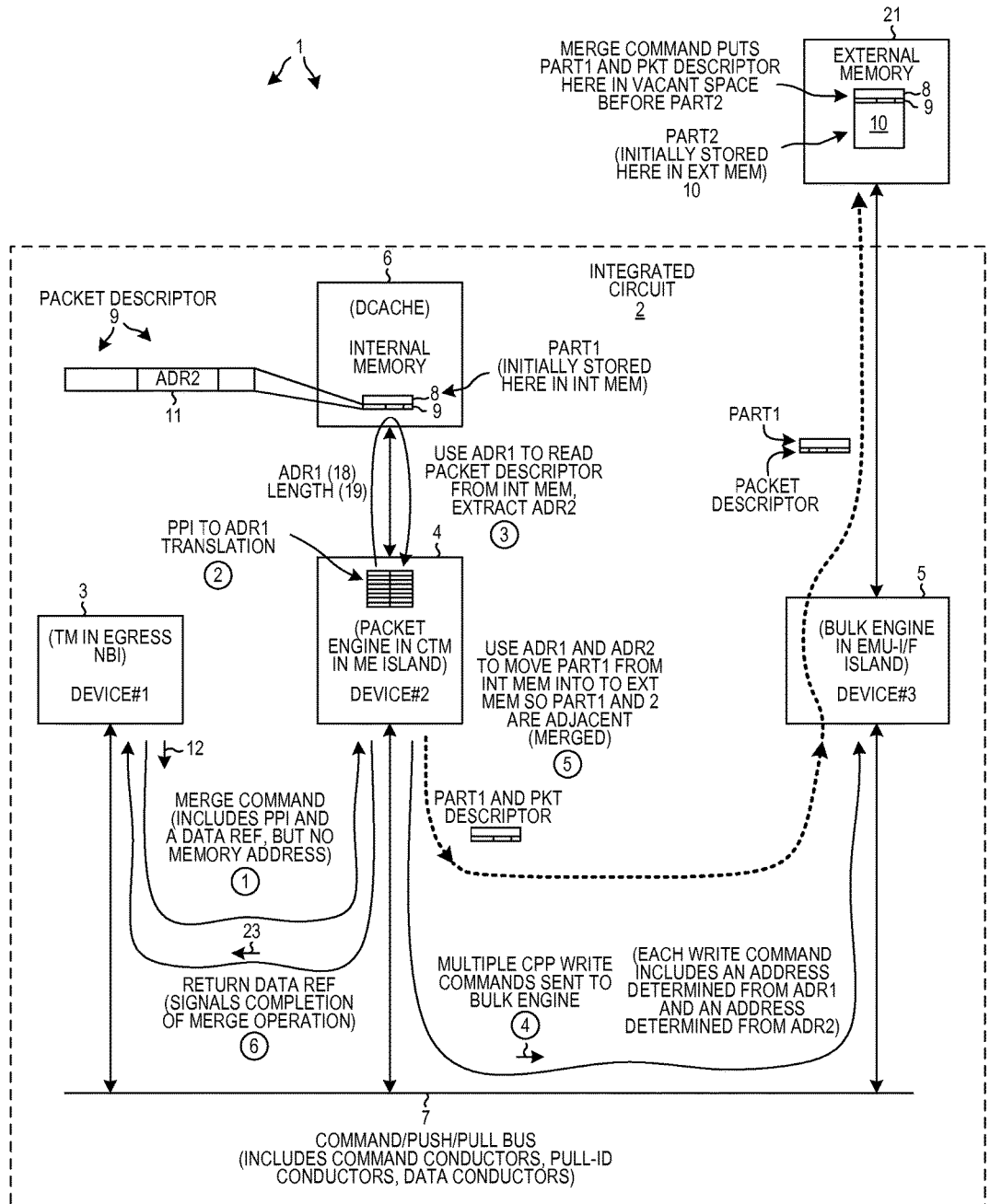
FIG. 2 is a diagram of a system that carries out the addressless merge command method of FIG. 1.

FIG. 1 is a flowchart of a method 100 in accordance with one novel aspect. FIG. 2 is a diagram of a system 1 that carries out the method 100 of FIG. 1. A circled reference numeral appearing in the diagram of FIG. 2 corresponds to the method step in the flowchart that is labeled with the same circled reference numeral.

System 1 of FIG. 2 includes an integrated circuit 2 and an external memory 21. Integrated circuit 2 includes a DEVICE#1 3, a DEVICE#2 4, a DEVICE#3 5, an internal memory 6, and a Command/Push/Pull bus 7. In one example, DEVICE#1 is a DMA engine of a traffic manager or scheduler in an egress Network Bus Interface (NBI) island of integrated circuit 2, DEVICE#2 is a packet engine in a Cluster Target Memory (CTM) in an ME island of integrated circuit 2, and DEVICE#3 is a bulk engine in an external MU control island of integrated circuit 2. The internal memory 6 is a data cache memory (DCACHE) portion of the CTM. The external memory 21 is an amount of external DRAM (Dynamic Random Access Memory) that is external to integrated circuit 2, but that is accessed by integrated circuit 2 through the external MU control island. The CPP bus 7 includes a command mesh, a pull-id mesh, and two data meshes. For a general description of a Command/Push/Pull bus, and for a description of the operation and structure of CPP bus 7 and its four meshes in particular, see: U.S. patent application Ser. No. 13/399,324, entitled "Configurable Mesh Data Bus In An Island-Based Network Flow Processor", filed Feb. 17, 2012, by Gavin J. Stark (all the subject matter of which is hereby incorporated by reference).

Initially, a first part (PART1) 8 of an amount of data, along with an associated descriptor 9, is stored in the internal memory 6. The descriptor is stored so that it occupies memory space that is adjacent to, and immediately follows, memory space occupied by the first part (PART1) of the data. The descriptor 9 includes information about the amount of data. PART1 of the data is stored in internal memory 6 starting at a memory location having an address of ADR1. A second part (PART2) 10 of the amount of data is stored in the external memory 21. A vacant amount of memory space, of an appropriate size that it could store PART1 and the packet descriptor, is left vacant at the beginning of PART2 in the external memory. The descriptor 9 includes a memory address value ADR2 11 that identifies the starting address location where PART2 is stored in the external memory.

In the method 100 of FIG. 1, DEVICE#1 sends (step 101) DEVICE#2 a novel "addressless" merge command 12 across the command mesh of the CPP bus 7. A master bus interface in DEVICE#1 is the master for this merge command CPP bus transaction. A target bus interface in DEVICE#2 is the target for this merge command CPP bus transaction. FIG. 3 is a diagram of the merge command 12. FIG. 4 is a table that sets forth the various fields of the merge command 12. The merge command 12 includes a final destination field 13, a valid bit 14, and a target ID field 15. The contents of these fields together direct the merge command 12 as it is communicated through the command mesh to the correct target interface in DEVICE#2. The merge command 12 also includes an action field 16 that contains a value. If this action value is "10101", then the command is determined by the receiving target interface to be a merge command as opposed to another type of command. In addition, the merge command 12 includes a PPI field 17 that includes an identifier (for example, a Packet Portion Identifier (PPI)) and a field 20 that contains a reference value. The identifier is a number that identifies the amount of data. There is a one-to-one relationship between each such identifier and its corresponding amount of data. In the present example, this amount of data is a packet and its descriptor, where PART1 is a first part of the packet including the header, where the descriptor is a packet descriptor, and where PART2 is the remaining part of the packet including the payload of the packet. In other examples, however, the amount of data is another amount of data that is stored in split fashion with PART1 being in the internal memory and with PART2 being in the external memory.

Although the merge command 12 includes the identifier of field 17, the merge command does not include any memory address. The merge command 12 is a command to move the first part PART1 8 of the identified amount of data along with the descriptor 9 from the internal memory to the external memory so that at the completion of the merge command PART1 8 and the associated descriptor 9 and PART2 10 will be stored together in the external memory 21 in such a way that they are adjacent one another. The command is therefore called a "merge" command. As a result of the merge command operation, PART1 8 and the following descriptor 9 are to be written into the vacant memory space left at the beginning of PART2 10 of the data where PART2 is stored in the external memory.

The target bus interface in DEVICE#2 receives the merge command 12 from the command mesh of the CPP bus 7. The target bus interface in DEVICE#2 examines the action field 16 to decode the command, and from the value of the action field determines that the command is a merge command. DEVICE#2 uses (step 102) the identifier value (the PPI value) from field 17 to perform a PPI-to-ADR translation operation. DEVICE#2 maintains a PPI Allocation Table (PAT) circuit and a Memory Allocation Table (MAT) circuit that maintain, for each identifier value, a corresponding address value and a corresponding length value. Accordingly, the result of the PPI-to-ADR translation operation is a first memory address ADR1 value 18 and a LENGTH value 19. The LENGTH value 19 indicates the length of PART1 8 and the packet descriptor 9 as they are stored together as a block in the internal memory. The memory address ADR1 value 18 identifies the starting address in the internal memory 6 where PART1 of the data is stored.

DEVICE#2 uses the memory address ADR1 to read (step 103) the packet descriptor 9 from the internal memory 6. In the present example, the packet descriptor 9 is stored in internal memory 6 immediately after PART1. The packet descriptor 9 includes information about the amount of data identified by the PPI identifier, including the memory address ADR2 11 where PART2 is stored. The memory address ADR2 is the memory address of the first memory location in external memory 21 where PART2 is stored.

DEVICE#2 extracts ADR2 (step 104) from the descriptor 9, and uses ADR2 and the length value LENGTH to generate and to output multiple CPP bus write commands (step 105) to DEVICE#3 5. The result of the outputting of these multiple CPP write commands onto the command mesh of the CPP bus is that a bulk engine data mover in DEVICE#3 reads PART1 and the packet descriptor from the internal memory and writes them (step 106) into the vacant memory space (located before PART2) in external memory 21. A state machine in an "entry" in a DMA resource handler in DEVICE#2 controls the outputting of each of these CPP write commands. Each CPP write command causes the bulk engine to move a corresponding amount (up to 128 bytes) from the internal memory to the external memory. The state machine handles determining the read and write addresses for each of these write commands so that PART1 and the packet descriptor is moved, 128-byte piece by 129-byte piece, into the external memory. The 128-byte pieces are written into adjacent memory locations in external memory 21 so that the overall PART1 and the following packet descriptor occupy one continuous block of memory addresses in external memory.

Figure 5:
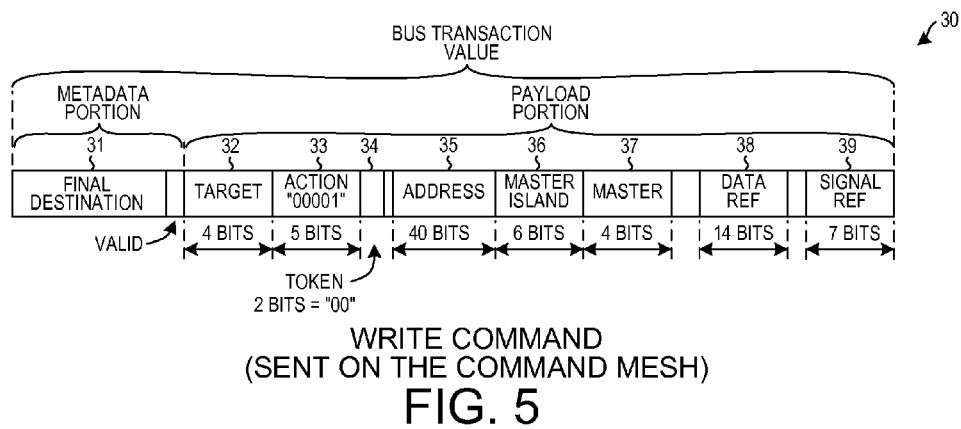
FIG. 5 is a diagram that illustrates one of the multiple write commands that is sent from DEVICE#2 to DEVICE#3 in the method of FIG. 1.

FIG. 5 is a diagram of a write command 30. As shown, a write command includes a final destination value field 31, and a target field 32. The final destination value indicates the island in integrated circuit 2 where the target is found. The target value identifies the target within that island. That the command is a write command is indicated by the action field 33 containing the code "00001" of a write, and the token field 34 containing a "00" value. The address field 35 contains an address in the external DRAM memory 21 where the data is to be written. The master island field 36 indicates the island where the master of the write command is located, and the master field 37 identifies the particular master within that island. In the present example, the master is the packet engine in the CTM of the ME island. The data reference field 38 contains an address where the data to be written is found. In the present example, this address is an address in the dcache internal memory 6. The signal reference field 39 contains the number of the particular "entry" in the DMA resource handler in the packet engine that originated the write command.

Figure 6:
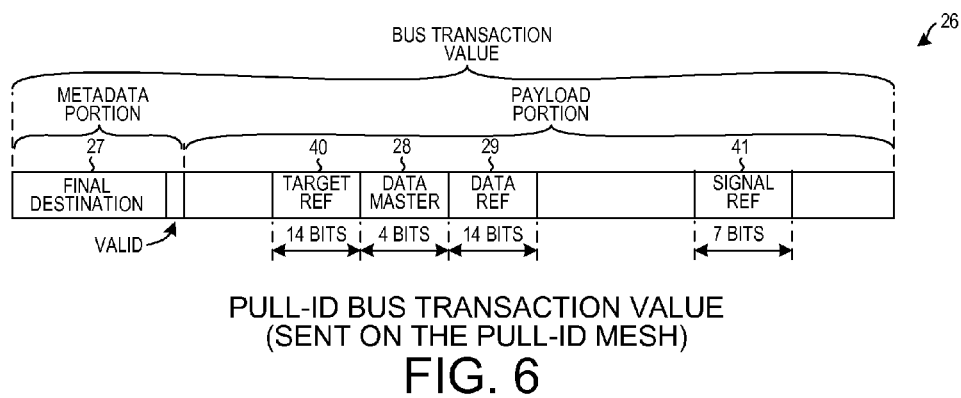
FIG. 6 is a diagram that illustrates a pull-id bus transaction value that is sent from DEVICE#3 to DEVICE#2 in the method of FIG. 1.

For a given CPP write command received onto DEVICE#3, the bulk engine in DEVICE#3 responds by returning a pull-id bus transaction value back to the CPP bus master interface in DEVICE#2 across the pull-id mesh of the CPP bus. FIG. 6 is a diagram of the pull-id bus transaction value 26. The pull-id bus transaction value 26 includes a final destination field 27 and a data master field 28. The final destination value of field 27 indicates the island to which the pull-id bus transaction value is directed. The data master value of field 28 identifies the master within that island. In addition, the pull-id bus transaction value 26 includes a data reference field 29. The data reference value in this field 29 is an address in the master (the master that originated the CPP write command) of the data to be written. In the present case, the value of field 29 is an address in the dcache internal memory 6 where the data to be written is found. In addition, the pull-id bus transaction value 26 includes a target reference field 40. This field contains a flag value (not an address) that identifies the pull-id. If the flag value is received by the target along with the data (via the data mesh), then the target uses the flag to associate the data with a particular pull-id. In addition, the pull-id bus transaction value 26 includes a signal reference value field 41. The content of this field 41 in this case is an entry number that identifies the one "entry" in the DMA resource handler in the packet engine it was that issued the write command. For example, if the signal reference value comes back to the master in a pull-id bus transaction value, then the master can use this signal reference value to determine the particular command that caused the pull-id to be sent.

In the present example, the CPP bus master interface in DEVICE#2 receives the pull-id bus transaction value 26 from the pull-id mesh of the CPP bus, extracts the data reference value, and uses the data reference value as a memory address to read the indicated data from the internal memory. The master in DEVICE#2 then supplies the indicated data along with the reference value (from the pull-id bus transaction value) back to the bus target in DEVICE#3. The CPP bus target interface in DEVICE#3 receives the data along with the data reference value via the data mesh of the CPP bus, and causes the data to be written into the external memory at an address field value indicated by the address field value of the original write CPP command. The state machine of the entry in the DMA handler in DEVICE#2 monitors the returning pull-id bus transaction values for the CPP write commands it issued, as the pull-id bus transaction values are received via the pull-id mesh of the CPP bus. The state machine uses the signal reference value in the pull-id bus transaction values to count the pull-id bus transaction values received back for that particular "entry". Only pull-id bus transaction values for commands issued by the particular entry will have a signal reference value equal to the number of the entry, so if the entry detects an incoming pull-id bus transaction value to have a signal reference value of its number (the number of the entry) then the entry determines that the pull-id bus transaction value was due to a command issued by that entry. When the state machine detects that the pull-id bus transaction value for the last CPP write command (step 107) has been sent across the CPP bus, the state machine causes the reference value (the reference value in field 20 of the original merge CPP command) to be returned (step 108) across the data mesh of the CPP bus to the CPP bus master in DEVICE#1 that originally issued the merge command.

Figure 7:
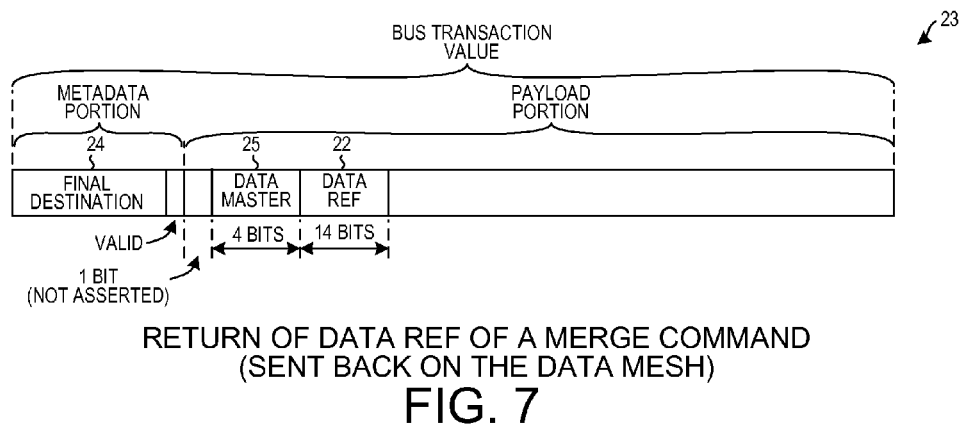
FIG. 7 is a diagram of a bus transaction value that is sent back to the master that originated the addressless merge command, where the bus transaction value returns a reference value that indicates that the overall operation of the addressless merge command has been completed.

FIG. 7 is a diagram of the bus transaction value 23 that contains a reference value field 22 that carries the same reference value that was included in the merge command. The final destination value in field 24, and the data master value in field 25, together identify the CPP bus master interface in DEVICE#1 to which the bus transaction value 23 is directed. The CPP bus master interface in DEVICE#1 receives the bus transaction value 23 from the data mesh of the CPP bus, and detects the presence of the data reference value, and uses the receipt of this data reference value as an indication that the overall operation of the merge command 12 has been completed.

In a first novel aspect, the novel merge command is usable to "merge" two parts of an amount of data, without the instructing master having to know or to specify any memory address in the command. The amount of data to be merged is simply identified by an identifier. The device that receives the merge command handles determining the addresses where the first and second parts of the data to be merged are stored, and handles issuing write commands with appropriate addresses in order to move the data. In a preferred embodiment, the device that receives the merge command is a packet engine that also allocates such PPI identifiers in response to PPI allocation requests. Once a PPI identifier has been allocated and assigned to a corresponding amount of data, the corresponding amount of data (the parts of which can be merged) can be identified in the merge command using the allocated identifier. When the packet engine receives the merge command that includes the PPI identifier, the packet engine looks up the addresses where the first and second parts of the corresponding amount of data are stored, and then uses these obtained addresses to cause the indicated merge to occur. Although a particular example of a device (DEVICE#2) is described here that receives addressless merge commands to merge parts of packets, the device has general applicability and in other examples receives addressless merge commands to merge parts of other items of data.

In a second novel aspect, the merge command is a type of chained CPP command in that a single CPP merge command causes another device to issue an associated plurality of CPP commands (a chain of CPP commands) so that a predetermined larger and more complex operation is performed. The other device (that receives the chained command) involves a hardwired state machine, and includes no processor that fetches and executes processor-executable instructions. When the more complex operation has been completed as a result of the carrying out of the numerous operations specified by the chain of CPP commands, the other device returns a reference value across the data mesh of the CPP bus back to the device that issued the original chained CPP command. The reference value returned is a reference value that was included in the original chained CPP command. The returned reference value signals completion of the overall more complex operation, and is sent back by a state machine and bus interface without any involvement of an instruction-executing processor.

Operational Example

Figure 8:
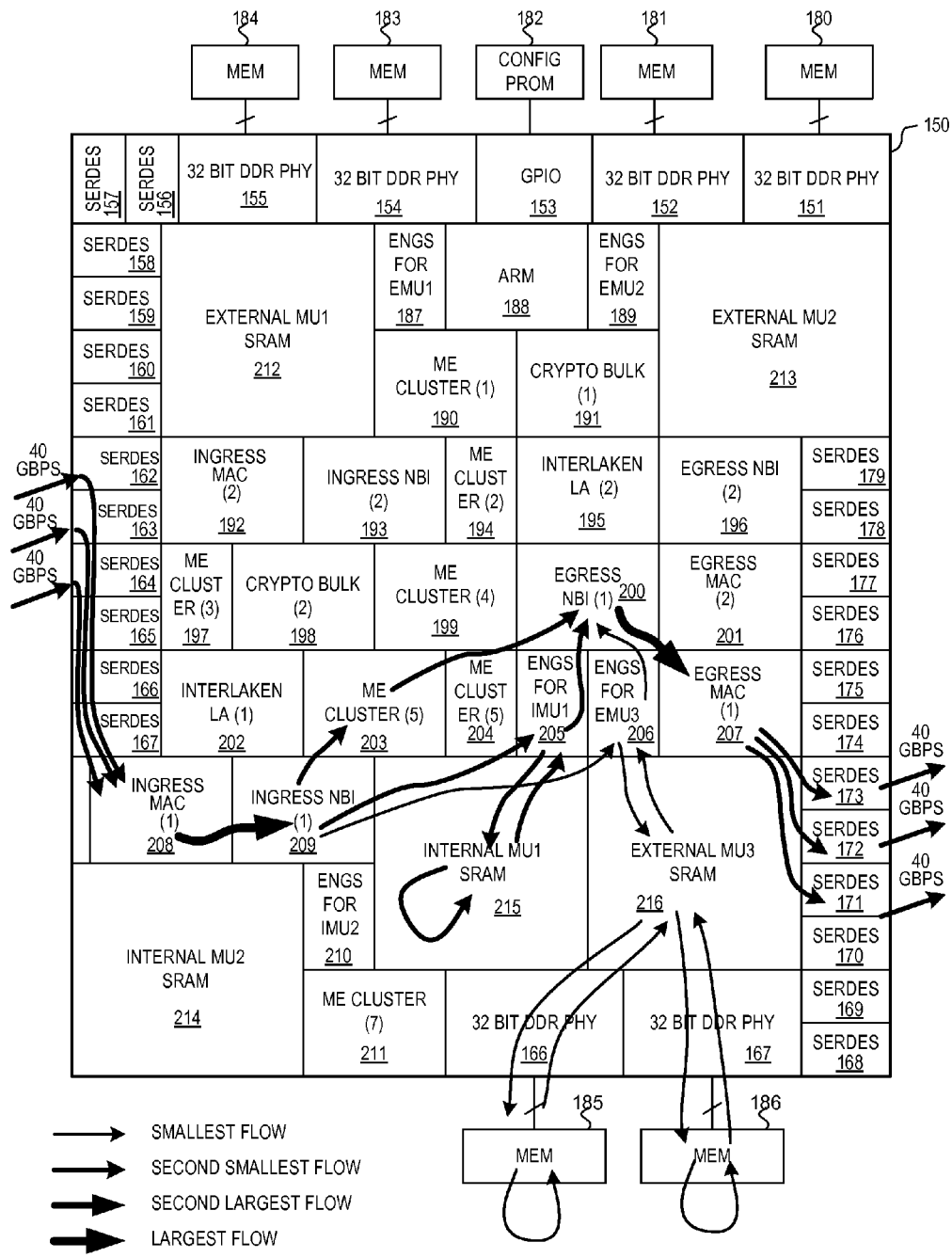
FIG. 8 is a diagram of an Island-Based Network Flow Processor (IB-NFP) integrated circuit that has a packet engine that receives addressless merge commands in accordance with one novel aspect.

FIG. 8 is a diagram that illustrates one example of packet traffic passing through an Island-Based Network Flow Processor (IB-NFP) integrated circuit 150, where the IB-NFP 150 includes a packet engine in accordance with one novel aspect.

The NFP integrated circuit 150 includes a peripheral first area of input/output circuit blocks 151-179. Each of the SerDes I/O circuit blocks 156-167 and 168-179 is duplex in that it has four 10 Gbps lanes for receiving SerDes information and it also has four 10 Gbps lanes for transmitting SerDes information. A SerDes circuit can communicate information in both directions simultaneously. The three SerDes circuits 162-164 can therefore communicate information at 120 gigabits per second in both directions. Respective ones of the DDR physical interfaces 151, 152, 154, 155, 166 and 167 are used to communicate with corresponding external memory integrated circuits 180, 181, 183, 184, 185 and 186, respectively. GPIO interface block 153 is used to receive configuration information from external PROM 182.

In addition to the first peripheral area of I/O blocks, the NFP integrated circuit 150 also includes a second tiling area of islands 187-211. Each of these islands is either a full rectangular shape, or is half the size of the full rectangular shape. For example, the island 192 is a full island. The island 197 is a half island. The functional circuits in the various islands of this second tiling area are interconnected by: 1) a configurable mesh Command/Push/Pull (CPP) data bus, 2) a configurable mesh control bus, and 3) a configurable mesh event bus. Each such mesh bus extends over the two-dimensional space of islands with a regular grid or "mesh" pattern. In the case of the CPP data bus, as described in further detail below, functional circuitry in one island can use the CPP data bus to send a command to functional circuitry in another island, to read data from functional circuitry in another island, or a write data to functional circuitry in another island.

In addition to the second tiling area, there is a third area of larger sized blocks 212-216. The mesh bus structures do not extend into or over any of these larger blocks. The functional circuitry of a larger sized block may connect by direct dedicated connections to an interface island within the tiling area and through this interface island achieve connectivity to the mesh buses and other islands.

In the operational example of FIG. 8, packet traffic is received into three SerDes input/output circuit blocks 162-164. The packet data in this particular example passes through dedicated connections from three SerDes circuit blocks 162-164 to the ingress MAC island 208. Ingress MAC island 208 converts successive symbols delivered by the physical coding layer into packets by mapping symbols to octets, by performing packet framing, and then by buffering the resulting packets in an SRAM memory for subsequent communication to other processing circuitry. After buffering in the SRAM, the resulting packets are communicated from ingress MAC island 208 across a single private inter-island minipacket bus, to ingress NBI (Network Bus Interface) island 209. Prepended to the beginning of each packet is a MAC prepend value that contains information about the packet and results of analyses (parse results PR) performed by the ingress MAC island. For each packet, the functional circuitry of ingress NBI island 209 examines fields in the header portion to determine what storage strategy to use to place the packet into memory.

In one example, the ingress NBI island 209 examines the header portion and from that determines whether the packet is an exception packet or whether the packet is a fast-path packet. If the packet is an exception packet, then the ingress NBI island 209 determines a first storage strategy to be used to store the packet so that relatively involved exception processing can be performed efficiently, whereas if the packet is a fast-path packet then the ingress NBI island determines a second storage strategy to be used to store the packet for more efficient transmission of the packet from the NFP integrated circuit 150. The ingress NBI island 209 examines a packet header, performs packet preclassification, determines that the packet is a fast-path packet, and determines that the header portion of the packet should pass to ME (Microengine) island 203. The header portion of the packet is therefore communicated across the configurable mesh CPP data bus from ingress NBI island 209 to ME island 203. The ME island 203 determines header modification and queuing strategy for the packet based on the packet flow (derived from packet header and contents) and the ME island 203 informs egress NBI island 200 of these.

In this simplified example being described, the payload portions of fast-path packets are placed into internal SRAM (Static Random Access Memory) MU block 215 and the payload portions of exception packets are placed into external DRAM 185 and 186. Half island 205 is an interface island through which all information passing into, and out of, SRAM MU block 215 passes. The functional circuitry within half island 205 serves as the interface and control circuitry for the SRAM within block 215. Accordingly, the payload portion of the incoming fast-path packet is communicated from ingress NBI island 209, across the configurable mesh CPP data bus to SRAM control island 205, and from control island 205, to the interface circuitry in block 215, and to the internal SRAM circuitry of block 215. The internal SRAM of block 215 stores the payloads so that they can be accessed for flow determination by the ME island 203.

In addition, a preclassifier in the ingress NBI island 209 determines that the payload portions for others of the packets should be stored in external DRAM 185 and 186. For example, the payload portions for exception packets are stored in external DRAM 185 and 186. Interface island 206, IP block 216, and DDR PHY I/O blocks 166 and 167 serve as the interface and control for external DRAM integrated circuits 185 and 186. The payload portions of the exception packets are therefore communicated across the configurable mesh CPP data bus from ingress NBI island 209, to interface and control island 206, to external MU SRAM block 216, to 32-bit DDR PHY I/O blocks 166 and 167, and to the external DRAM integrated circuits 185 and 186. At this point in the operational example, the packet header portions and their associated payload portions are stored in different places. The payload portions of fast-path packets are stored in internal SRAM in MU block 215, whereas the payload portions of exception packets are stored in external memories 185 and 186.

ME island 203 informs egress NBI island 200 where the packet headers and the packet payloads can be found and provides the egress NBI island 200 with an egress packet descriptor for each packet. Egress NBI island 200 places packet descriptors for packets to be output into the correct order. The egress packet descriptor indicates a queuing strategy to be used on the packet. For each packet that is then scheduled to be transmitted, the egress NBI island 200 uses the egress packet descriptor to read the header portion and any header modification, and to read the payload portion, and to assemble the packet to be transmitted. The egress NBI island 200 then performs packet modification on the packet, and the resulting modified packet then passes from egress NBI island 200 and to egress MAC island 207. Egress MAC island 207 buffers the packets, and converts them into symbols. The symbols are then delivered by dedicated conductors from the egress MAC island 207 to three SerDes circuits 171-173 and out of the IB-NFP integrated circuit 150. The SerDes circuits 171-173 together can provide 120 gigabits per second of communication throughput out of the integrated circuit.

Figure 9:
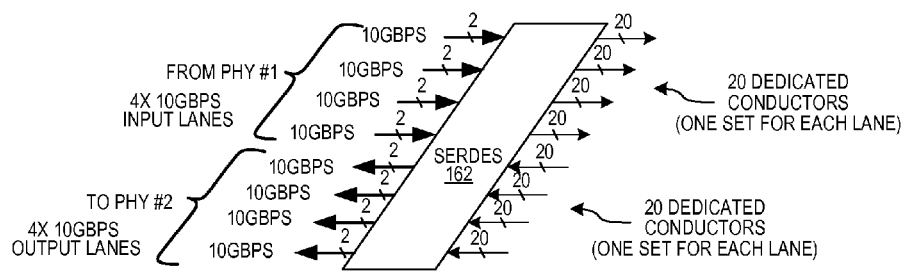
FIG. 9 is a diagram of a SerDes circuit in the IB-NFP integrated circuit of FIG. 8.

FIG. 9 is a more detailed diagram of one of the SerDes I/O blocks 162.

Figure 10:
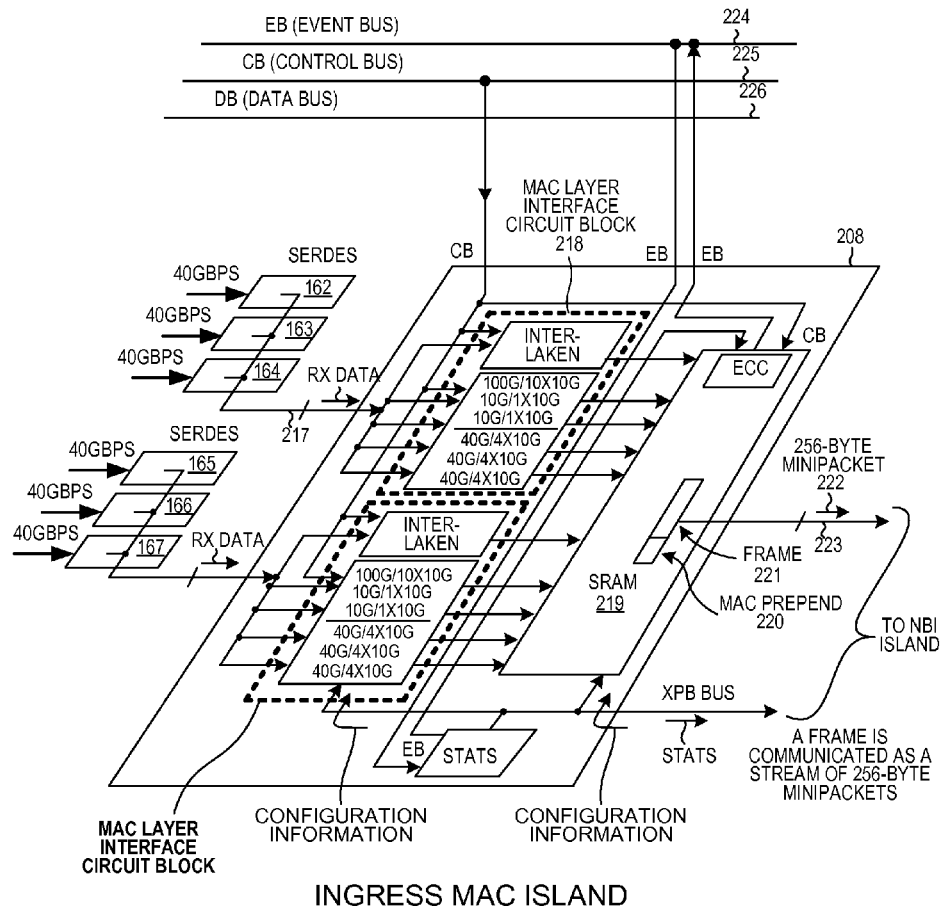
FIG. 10 is a diagram of an ingress MAC island in the IB-NFP integrated circuit of FIG. 8.

FIG. 10 is a more detailed diagram of the ingress MAC island 208. The symbols pass from the three SerDes I/O blocks 162-164 and to the ingress MAC island 208 across dedicated conductors 217. The symbols are converted into packets by a 100 Gbps ethernet block 218. The packets are parsed and analyzed, and a "MAC prepend value" 220 that contains information about the packet is placed at the beginning of the packet 221. The resulting packets and associated MAC prepend values are then buffered in SRAM 219. The MAC prepend value 220 includes: 1) an indication of the length of the packet, 2) an indication whether the packet is an IP packet, 3) and indication of whether the checksums are correct, and 4) a time stamp indicating when the packet was received. Packets that are buffered in SRAM 219 are then output from the ingress MAC island 208 to the ingress NBI island 209 in the form of one or more 256-byte minipackets 222 that are communicated across dedicated connections 223 of a minipacket bus to the ingress NBI island 209. The event bus mesh, the control bus mesh, and the CPP data bus mesh mentioned above are represented in FIG. 10 by reference numerals 224-226, respectively. For additional detailed information on the structure and operation of the ingress MAC island 208, see: U.S. patent application Ser. No. 14/321,732, entitled "Merging PCP Flows As They Are Assigned To A single Virtual Channel", filed on Jul. 1, 2014, by Joseph M. Lamb (all the subject matter of which is hereby incorporated by reference).

Figures 11, 12:
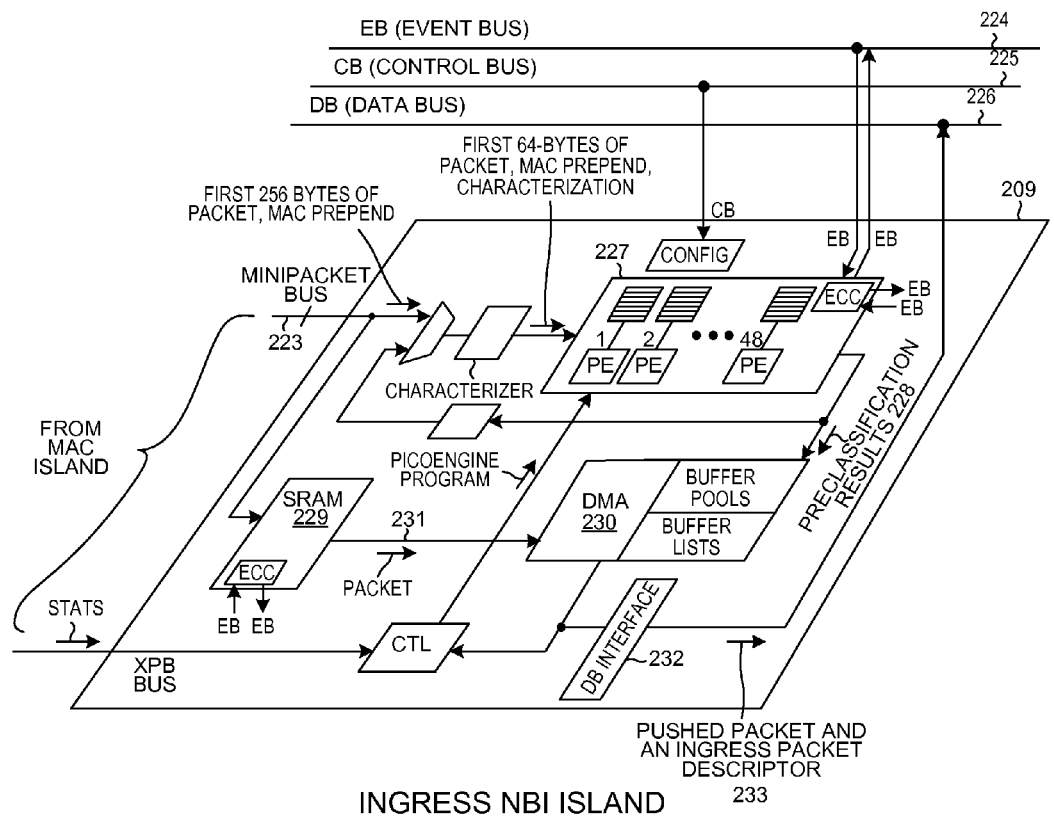
FIG. 11 is a diagram of an ingress NBI island in the IB-NFP integrated circuit of FIG. 8.
FIG. 12 is a table that sets forth the various components of the preclassification results generated by the picoengine pool in the ingress NBI island of FIG. 11.

FIG. 11 is a more detailed diagram of the ingress NBI island 209. Ingress NBI island 209 receives the MAC prepend and the minipacket information via dedicated minipacket bus connections 223 from the ingress MAC island 208. The first 256 bytes of the frame and the MAC prepend pass through multiplexing circuitry and are analyzed by a pool 227 of forty-eight picoengines. Pool 227 generates preclassification results 228. FIG. 12 is a diagram that describes various parts of the preclassification results 228. The preclassification results 228 include: 1) a determination of which one of multiple buffer pools to use to store the frame, 2) a sequence number for the frame in a particular flow of frames through the NFP integrated circuit, and 3) user metadata. The user metadata is typically a code generated by the picoengine pool 227, where the code communicates certain information about the packet. In one example, the user metadata includes a bit that indicates whether the frame was determined by the picoengine pool 227 to be an exception frame or packet, or whether the frame was determined to be a fast-path frame or packet. The frame is buffered in SRAM 229. A buffer pool is a set of targets in ME islands where header portions can be placed. A buffer list is a list of memory addresses where payload portions can be placed. DMA engine 230 can read the frame out of SRAM 229 via conductors 231, then use the buffer pools to determine a destination to which the frame header is to be DMA transferred, and use the buffer lists to determine a destination to which the frame payload is to be DMA transferred. The DMA transfers occur across the configurable mesh CPP data bus.

In the case of an exception packet, the preclassification user metadata and buffer pool number indicate to the DMA engine 230 that the frame is an exception frame and this causes a first buffer pool and a first different buffer list to be used, whereas in the case of a fast-path frame the preclassification user metadata and buffer pool number indicate to the DMA engine that the frame is a fast-path frame and this causes a second buffer pool and a second buffer list to be used. CPP bus interface 232 is a CPP bus interface through which the configurable mesh CPP data bus 226 is accessed. Arrow 233 represents frames (packets) that are DMA transferred out of the ingress NBI island 209 by DMA engine 230 and through CCP bus interface 232. Each frame (packet) is output with a corresponding ingress packet descriptor. FIG. 13 sets forth the parts of an ingress packet descriptor. An ingress packet descriptor includes: 1) an address indicating where the header portion is stored (in which ME island), 2) an address indicating where the payload portion is stored (which MU island, either for internal SRAM or for external DRAM), 3) how long the frame (packet) is, 4) a sequence number for the flow to which the frame (packet) belongs, 5) user metadata.

After the picoengine pool 227 in the ingress NBI island 209 has done its analysis and generated its preclassification results for the packet, the ingress NBI island 209 then DMA transfers the frame headers (packet headers) and associated preclassification results across the CPP configurable mesh data bus 226 and into the ME island 203. Within the ME island 203, one or more microengines (MEs) then perform further processing on the header and preclassification results as explained in further detail in U.S. patent application Ser. No. 13/399,888, entitled "Island-Based Network Flow Processor Integrated Circuit", filed Feb. 17, 2012, by Stark et al. (all the subject matter of which is hereby incorporated by reference).

Figure 14:
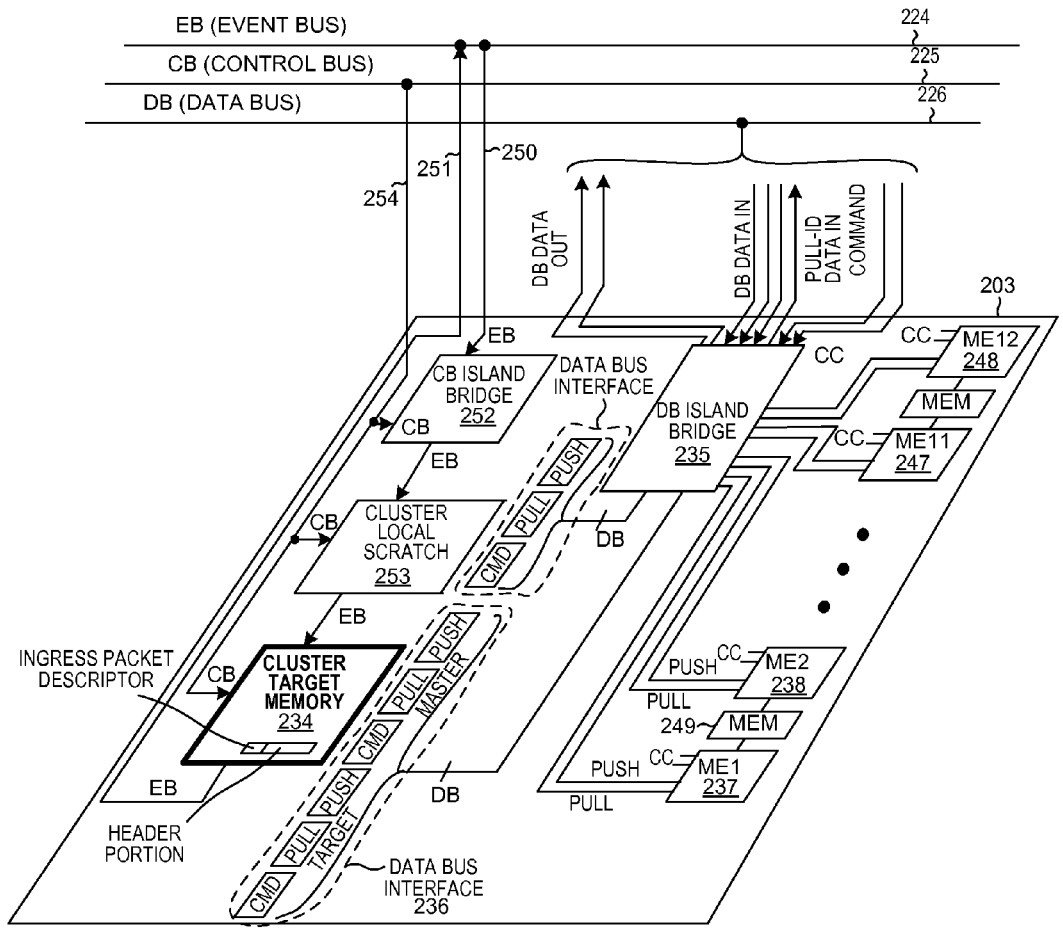
FIG. 14 is a diagram of an ME island in the IB-NFP integrated circuit of FIG. 8.

FIG. 14 is a more detailed diagram of ME island 203. In the operational flow of FIG. 8, packet headers and the associated preclassification results are DMA transferred from the ingress NBI island 209 across the configurable mesh CCP data bus and into the Cluster Target Memory (CTM) 234 of ME island 203. A DMA engine 230 in the ingress NBI island 209 is the master and CTM 234 in ME island 203 is the target for this transfer. The packet header portions and the associated ingress packet descriptors pass into the ME island 203 via CPP data bus island bridge 235 and data bus interface circuitry 236. Once in the CTM 234, the header portions are analyzed by one or more of twelve microengines (MEs) 237-248. The MEs have, through the DB island bridge 235, a command out interface, a pull-id in interface, a pull-data out interface, and a push data in interface. There are six pairs of MEs, with each pair sharing a memory containing program code for the MEs. Reference numerals 237 and 238 identify the first pair of MEs and reference numeral 249 identifies the shared memory. As a result of analysis and processing, the MEs modify each ingress packet descriptor to be an egress packet descriptor.

FIG. 15 is a diagram that describes the parts of an egress packet descriptor. Each egress packet descriptor includes: 1) an address indicating where and in which ME island the header portion is found, 2) an address indicating where and in which MU island the payload portion is found, 3) how long the packet is, 4) a sequence number of the packet in the flow, 5) an indication of which queue the packet belongs to (result of the packet policy), 6) an indication of where the packet is to be sent (a result of the packet policy), 7) user metadata indicating what kind of packet it is. Memory errors and other events detected in the ME island are reported via a local event ring and the global event chain back to the ARM island 188. A local event ring is made to snake through the ME island 203 for this purpose. Event packets from the local event chain are received via connections 250 and event packets are supplied out to the local event chain via connections 251. The CB island bridge 252, the cluster local scratch 253, and CTM 234 can be configured and are therefore coupled to the control bus CB via connections 254 so that they can receive configuration information from the control bus CB 255. The event bus and the control bus are shown in simplified form in these diagrams.

Figure 16:
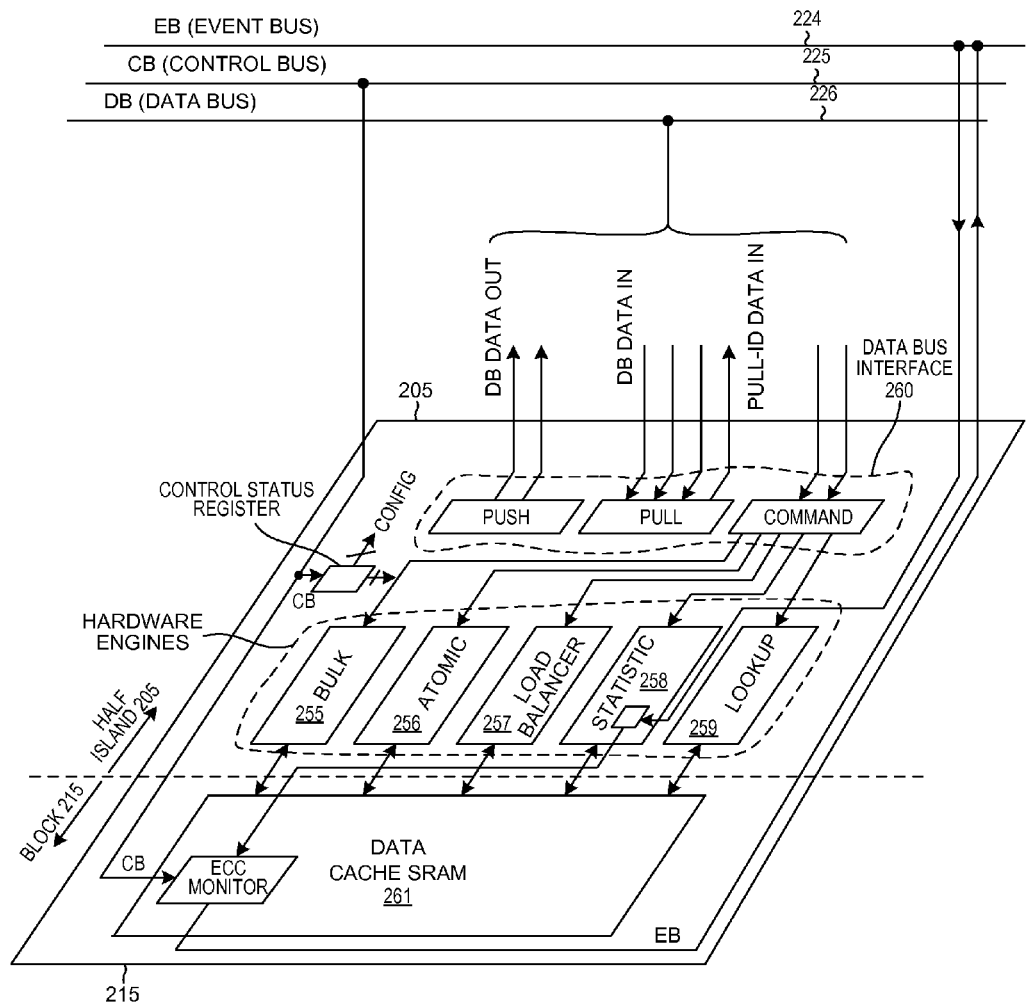
FIG. 16 is a diagram of an MU island in the IB-NFP integrated circuit of FIG. 8.

FIG. 16 is a diagram of MU half island 205 and SRAM block 215. MU half island 205 includes several hardware engines 255-259. In the operational example, fast path packet payloads are DMA transferred directly from ingress NBI island 209 and across the configurable mesh data bus, through data bus interface 260 of half island 205, and into the data cache SRAM 261 of block 215. The ingress NBI DMA engine 230 issues a bulk write command across the configurable mesh data bus to the bulk transfer engine 255. The destination is the MU half island 205. The action is bulk write. The address where the data is to be written into the MU half island is the address taken out of the appropriate buffer list. The bulk write command received at the MU is a bulk write, so the data bus interface 260 presents the command to the bulk engine 255. The bulk engine 255 examines the command which is a write. In order to perform a write, the bulk engine needs data. The bulk engine therefore issues a pull-id through the pull portion of interface 260, which in turn issues a pull-id back onto the configurable mesh CPP data bus. The DMA engine 230 in NBI island 209 receives the pull-id. Part of the pull-id is a data reference which indicates to the DMA engine which part of the packet is being requested as data. The DMA engine uses the data reference to read the requested part of the packet, and presents that across the data part of the CPP data bus back to bulk engine 255 in MU island 205. The bulk engine 255 then has the write command and the packet data. The bulk engine 255 ties the two together, and it then writes the packet data into SRAM 261 at the address given in the write command. In this way, fast path packet payload portions pass from DMA engine 230 in the ingress NBI island 209, across the configurable mesh CPP data bus, through the data bus interface 260 of the MU half island 205, through a bulk transfer engine 255, and into data cache SRAM 261 of block 215. In a similar fashion, exception packet payload portions pass from the DMA engine 230 in ingress NBI island 209, across the configurable mesh CPP data bus, through the data bus interface of half island 206, through the bulk transfer engine of half island 206, and through DDR PHYs 166 and 167, and into external memories 185 and 186.

Figure 17:
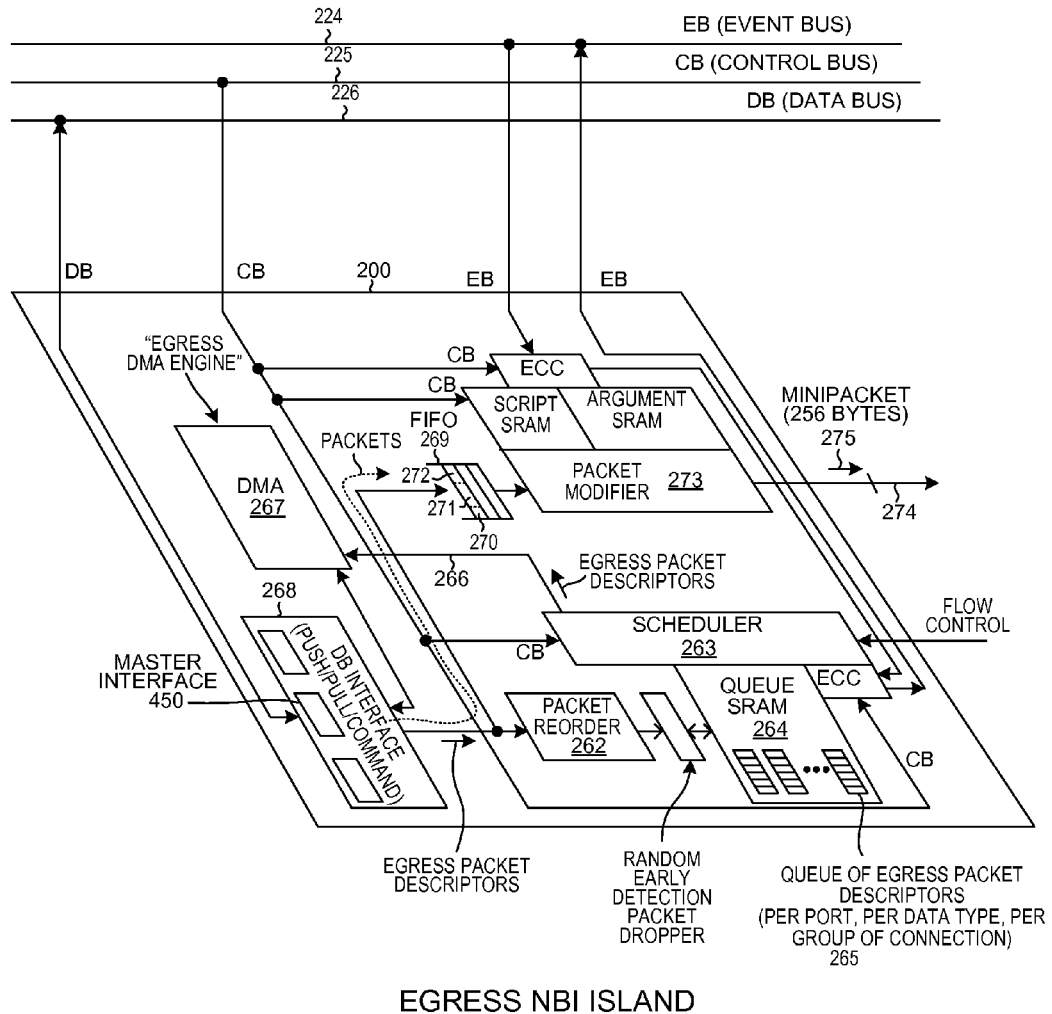
FIG. 17 is a diagram of an egress NBI island in the IB-NFP integrated circuit of FIG. 8.

FIG. 17 is a diagram of egress NBI island 200. In the operational example, ME island 203 instructs the egress NBI island 200 to transmit a packet by supplying the egress NBI island with an egress packet descriptor of the packet to be transmitted. The ME island 203 supplies the egress packet descriptor to the egress NBI island 200 by issuing a transmit packet command across the configurable mesh CPP data bus and to the packet reorder block 262. The packet reorder block 262 responds by pulling the egress packet descriptor from the ME island across the CPP data bus. In this way, multiple egress packet descriptors enter packet reorder block 262. These egress packet descriptors are reordered so that the descriptors for the packets of a flow are in proper sequence. The scheduler 263 receives the properly ordered egress packet descriptors and pushes them onto appropriate queues in queue SRAM 264. Each such queue of egress packet descriptors is per port, per data type, per group of connections. Reference numeral 265 identifies one such queue. Packets of a connection in this case share the same set of source and destination IP addresses and TCP ports. Scheduler 263 schedules packets to be transmitted by popping egress packet descriptors off the queues in appropriate orders and at appropriate times, and by supplying the popped egress packet descriptors via conductors 266 to the DMA engine 267. DMA engine 267 receives such an egress packet descriptor, and based on the information in the egress packet descriptor, operates with master interface 450 to transfer the payload portion and the header portion of the packet across CPP data bus and DB interface 268 and into FIFO 269. As a result, each entry in FIFO 269 includes a complete packet having a script code portion 270, the header portion 271, and the payload portion 272.

Information can be written into FIFO 269 as larger values, but information passes out of FIFO 269 and into the packet modifier 273 in ordered 32-byte chunks. The script code 270 at the beginning of the packet was added by the microengine in the ME island. As a result of the lookup performed at the direction of the microengine, a packet policy was determined, and part of this packet policy is an indication of what of the packet header to change and how to change it before the packet is transmitted. The packet modifier 273 receives a packet in 32-byte chunks from FIFO 269. As each 32-byte chunk passes through the packet modifier 273, it can increase in size due to the insertion of bits, or it can decrease in size due to the deleting of bits. The chunks pass through the pipeline in sequence, one after the other. The resulting modified chunks as they come out of the pipeline are aggregated at the end of the packet modifier 273 into larger 256-byte portions of a packet, referred to here as minipackets. A minipacket includes a number of chunks, along with associated out-of-band control information. The out-of-band control information indicates how the data of the minipacket can be assembled with the data of other minipackets to reform the overall modified packet. In this way, the resulting modified packet is output from the egress NBI island 200 as a sequence of 256-byte minipackets across dedicated connections 274 to egress MAC island 207. Reference numeral 275 identifies one such minipacket. For additional detailed information on the structure and operation of the egress NBI island 200, see: U.S. patent application Ser. No. 13/941,494, entitled "Script-Controlled Egress Packet Modifier", filed on Jul. 14, 2013, by Chirag P. Patel et al. (all the subject matter of which is hereby incorporated by reference).

Figure 18:
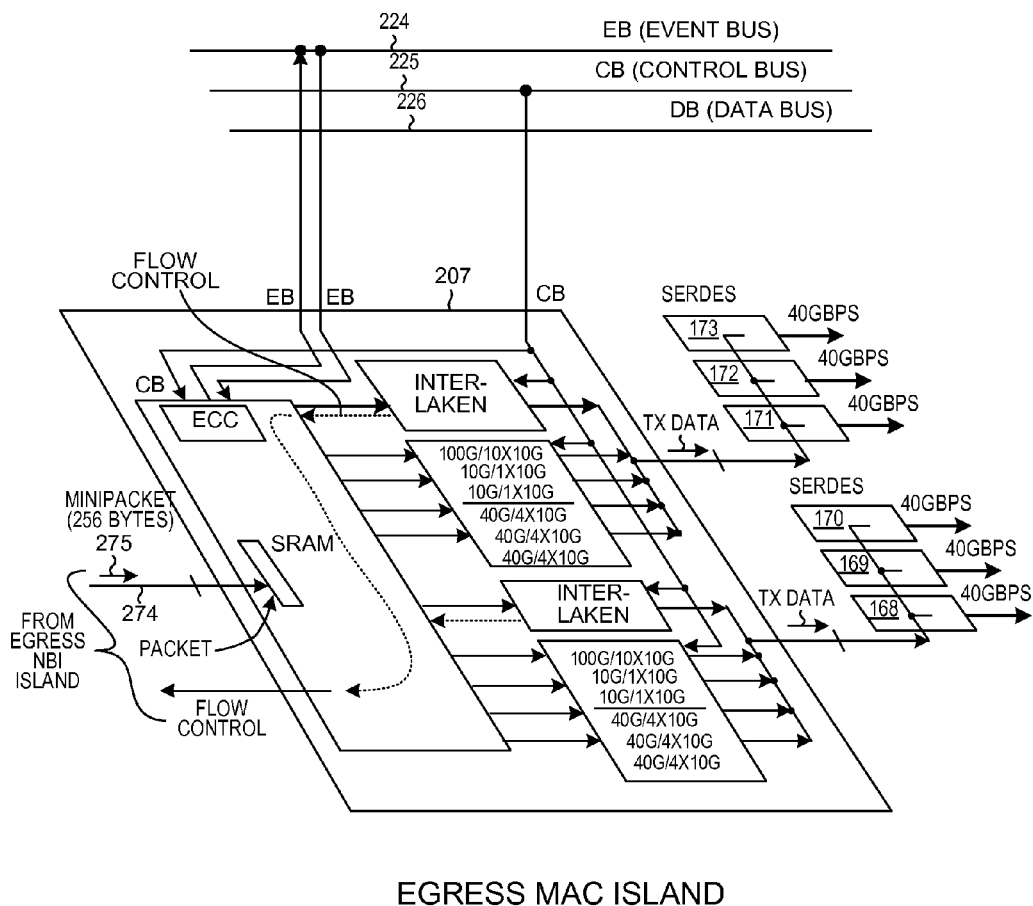
FIG. 18 is a diagram of an egress MAC island in the IB-NFP integrated circuit of FIG. 8.

FIG. 18 is a diagram of egress MAC island 207. In the presently described example, the packet traffic discussed in connection with FIG. 8 flows out of the egress MAC island 207 and through three SerDes I/O circuits 171-173 and out of the IB-NFP integrated circuit 150.

Figure 19:
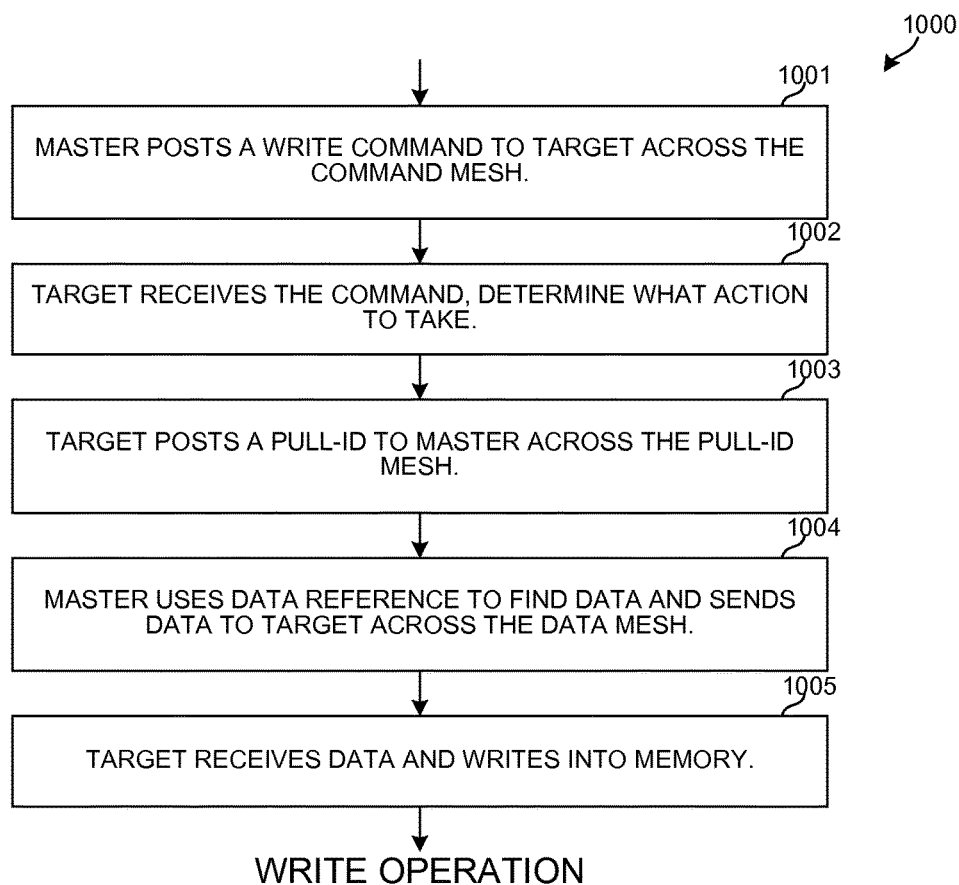
FIG. 19 is a flowchart that illustrates steps involved in a CPP write operation.

CCP Data Bus Operation: Operation of the Command/Push/Pull data bus is described below in connection with FIGS. 19-26. The CPP data bus includes four "meshes": a command mesh, a pull-id mesh, and two data meshes data0 and data1. FIG. 19 is a flowchart of a write operation method 1000 that might occur across the configurable mesh CPP data bus. In a first step (step 1001), certain functional circuitry in one of the islands uses its data bus interface to output a bus transaction value onto the configurable mesh CPP data bus. This functional circuitry is referred to as the "master" of the write operation. The format of the bus transaction value is as set forth in FIG. 20. A bus transaction value 1006 includes a metadata portion 1007 and a payload portion 1008 as shown. The metadata portion 1007 includes a final destination value 1009 and a valid bit 1010.

The bus transaction value in this case is a write command to write data into functional circuitry in another island. The functional circuitry that receives the bus transaction value and the data to be written is referred to as the "target" of the write operation. The write command is said to be "posted" by the master circuit onto the command mesh. As indicated in FIG. 20, the write command includes a metadata portion and a payload portion. The metadata portion includes the 6-bit final destination value. This final destination value identifies an island by number, where the island identified is the final destination of the bus transaction value. The final destination value is used by the various crossbar switches of the command mesh to route the bus transaction value (i.e., the command) from the master circuit to the appropriate target circuit. All bus transaction values on the data bus that originate from the same island that have the same final destination value will traverse through the configurable mesh data bus along the same one path all the way to the indicated final destination island.

A final destination island may have more than one potential target circuit. The 4-bit target field of payload portion indicates which one of these targets in the destination island it is that is the target of the command. The 5-bit action field of the payload portion indicates that the command is a write. The 14-bit data reference field is a reference usable by the master circuit to determine where in the master the data is to be found. The address field indicates an address in the target where the data is to be written. The length field indicates the amount of data.

In a next step (step 1002) in the method 1000 of FIG. 19, the target circuit receives the write command from the command mesh and examines the payload portion of the write command. From the action field the target circuit determines that it is to perform a write action. To carry out this action, the target circuit writes (i.e., posts) a bus transaction value (step 1003) called a pull-id onto the pull-id mesh. The pull-id is also of the format indicated in FIG. 20. The payload portion of the pull-id is of the format set forth in FIG. 22. The final destination field of the metadata portion of the pull-id indicates the island where the master circuit is located. The target port field identifies which sub-circuit target it is within the target's island that is the target circuit of the command. The pull-id is communicated through the pull-id mesh back to the master circuit.

The master circuit receives the pull-id from the pull-id mesh and uses the content of the data reference field of the pull-id to find the data. In the overall write operation, the master circuit knows the data it is trying to write into the target circuit. The data reference value that is returned with the pull-id is used by the master circuit as a flag to match the returning pull-id with the write operation the master circuit had previously initiated.

The master circuit responds by sending (step 1004) the identified data to the target across one of the data meshes data0 or data1 as a "pull" data bus transaction value. The term "pull" means that the data of the operation passes from the master to the target. The term "push" means that the data of the operation passes from the target to the master. The format of the "pull" data bus transaction value sent in this sending of data is also as indicated in FIG. 20. The format of the payload portion in the case of the payload being pull data is as set forth in FIG. 24. The first bit of the payload portion is asserted. This bit being a digital high indicates that the transaction is a data pull as opposed to a data push. The target circuit then receives (step 1005) the data pull bus transaction value across the data1 or data0 mesh. The target circuit writes the content of the data field (the data field of FIG. 24) of the pull data payload portion into target memory at the appropriate location indicated by the address field of the original write command.

Figure 26:
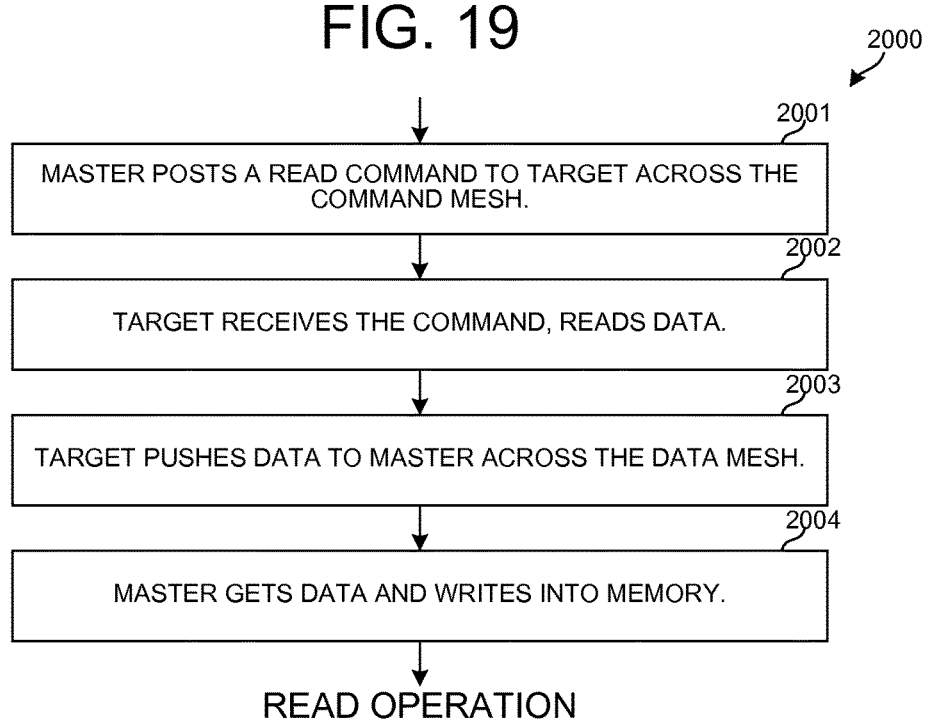
FIG. 26 is a flowchart that illustrates steps involved in a CPP read operation.

FIG. 26 is a flowchart of a read operation method 2000 that might occur across the configurable mesh CPP data bus. In a first step (step 2001), a master circuit in one of the islands uses its data bus interface to output (to "post") a bus transaction value onto the command mesh bus of the configurable mesh CPP data bus. In this case, the bus transaction value is a read command to read data from a target circuit. The format of the read command is as set forth in FIGS. 20 and 21. The read command includes a metadata portion and a payload portion. The metadata portion includes the 6-bit final destination value that indicates the island where the target is located. The action field of the payload portion of the read command indicates that the command is a read. The 14-bit data reference field is usable by the master circuit as a flag to associated returned data with the original read operation the master circuit previously initiated. The address field in the payload portion indicates an address in the target where the data is to be obtained. The length field indicates the amount of data.

The target receives the read command (step 2002) and examines the payload portion of the command. From the action field of the command payload portion the target circuit determines that it is to perform a read action. To carry out this action, the target circuit uses the address field and the length field to obtain the data requested. The target then pushes (step 2003) the obtained data back to the master circuit across data mesh data1 or data0. To push the data, the target circuit outputs a push bus transaction value onto the data1 or data0 mesh. FIG. 25 sets forth the format of the payload portion of this push bus transaction value. The first bit of the payload portion indicates that the bus transaction value is for a data push, as opposed to a data pull. The master circuit receives the bus transaction value of the data push (step 2004) from the data mesh bus. The master circuit then uses the data reference field of the push bus transaction value to associate the incoming data with the original read command, and from the original read command determines where the pushed data (data in the date field of the push bus transaction value) should be written into the master circuit.

The master circuit then writes the content of the data field of the data field into the master's memory at the appropriate location.

Figure 27:
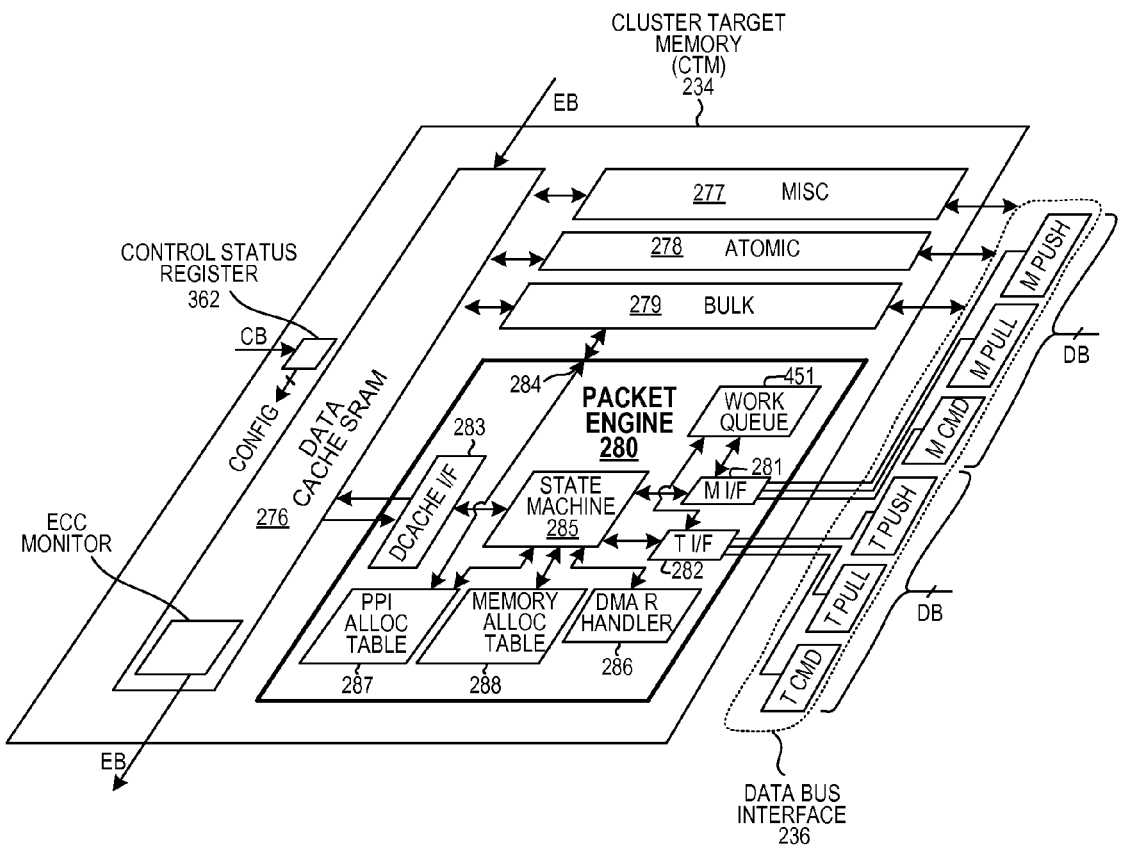
FIG. 27 is a diagram of the CTM (Cluster Target Memory) in the ME island of FIG. 14.

FIG. 27 is a more detailed diagram of the Cluster Target Memory (CTM) 234 in the ME island 203 of FIG. 14. CTM 234 includes a data cache SRAM 276, an engine 277 called the miscellaneous engine (MISC), an atomic engine 278, a bulk mover engine 279, and a novel packet engine 280. The packet engine 280 includes, among other parts not illustrated, a master CPP bus interface circuit 281, a target CPP bus interface circuit 282, a work queue 451, a data cache interface circuit 283, a bulk engine interface circuitry 284, a state machine 285, a DMA resource handler 286, a PPI Allocation Table circuit (PAT) 287, and a Memory Allocation Table circuit (MAT) 288. The packet engine 280 can operate as a CPP bus master in a CPP bus transaction by using its master CPP bus interface circuit 281 and the master portion of the data bus interface circuit 236 to access the CPP data bus 226. Another CPP bus master located elsewhere on the integrated circuit can access the packet engine via the CPP data bus 226, with the packet engine acting as a CPP bus target. The target portion of the data bus interface circuit 236 and the target interface circuit 282 together function as a CPP data bus target. The packet engine 280 can write to and read from the data cache SRAM 276 via the data cache interface circuit 283. The bulk engine mover 279 can use the packet engine 280 as a PPI-to-address translation resource. The bulk engine uses the packet engine 280 to perform a PPI-to-memory address translation resource by presenting a PPI to be translated to the packet engine on interface 284 and by receiving in response a memory address from the packet engine 280 on interface 284.

Packet engine 280 receives "PPI allocation request" CPP commands from credit-aware requestors (for example, from the DMA controller in an ingress NBI island) via the CPP data bus. If the packet engine 280 receives such a PPI allocation request command, then it consults it PAT and MAT circuits. If the PAT and MAT circuits indicate that there is an available PPI and that there is adequate memory space to store the packet data associated with the PPI allocation request, then the packet engine allocates an unused PPI to the packet data. The packet engine updates its PAT and MAT circuits to reflect that the newly-allocated PPI is now being used and that the appropriate amount of buffer space is allocated to the PPI. The packet engine also sends the credit-aware requestor back a "PPI allocation response" where the PPI allocation response includes the PPI. Another function of the packet engine is to receive amounts of packet data that are tagged with PPIs. If the packet engine receives such an amount of packet data that is tagged with a PPI, then the packet engine uses its PAT and MAT circuits to translate the PPI into a memory address or addresses and uses the memory address or addresses to write the packet data into the appropriate buffer or buffers in data cache memory 276. In addition, the packet engine maintains the work queue. Each entry in the work queue indicates a microengine (ME) that is available to process a packet portion. The packet engine uses information stored in its PAT and MAT circuits to read packet data associated with a PPI, and to send that packet data and the PPI to the next available microengine as indicated by the work queue.

Another function of the packet engine is to receive "packet complete" CPP commands from microengines. A "packet complete" CPP command serves to tell the packet engine that the micoengine has completed its processing of the packet data associated with a particular PPI. If the packet engine receives such a "packet complete" CPP command, it logs in its PAT and MAT circuits the updated status of the processing associated with the PPI, and it forwards the "packet complete" CPP command to the appropriate egress NBI island. Another function of the packet engine is to receive "de-allocate PPI" CPP commands from egress NBI islands. If the packet engine receives such a "de-allocate PPI" CPP command, then the packet engine de-allocates the indicated PPI. The PPI changes the information stored in the PAT circuit to reflect that the PPI is now not being used. The PPI also changes the information stored in the MAT circuit to reflect that the buffer space previously used to store the packet data associated with the PPI is now available for use in storing other packet data. The packet engine also sends the original PPI requestor a PPI "Credits To Be Returned" (CTBR) value and a Buffer CTBR value, so that the credit-aware requestor can add the credits back to its PPI "Credits Available" value and to its buffer "Credits Available" value.

FIG. 28 is a diagram that illustrates operation of the PPI Allocation Table circuit (PAT) 287 in the packet engine 280 of the CTM 234 of FIG. 27. The circuit is not a table, but rather is circuitry that implements the table and the described table operations. There are five hundred and twelve 9-bit PPIs, each of which is either being used or is unused at a given time. If a PPI is being used (i.e., has been allocated), then the valid bit in the row of the PPI is set, otherwise the valid bit in that row is not set. In addition, for each used PPI, the PAT circuit stores an indication of the "owner" of the PPI. The owner is the device (for example, the DMA engine in ingress NBI-0, the DMA engine in ingress NBI-1, or an ME) that originally submitted an allocation request for the PPI and to which the PPI is currently allocated. In addition, for each PPI, the PAT circuit stores an indication of the size of the "packet portion" identified by the PPI (Packet Portion Identfier). The "packet portion" can be either 256B, 512B, 1 KB and 2 KB in size. In addition, for each PPI, the PAT circuit stores the starting address in dcache SRAM that is reserved for storing the "packet portion" associated with the PPI. In addition, the PAT circuit stores an indication of whether the first part of the packet portion has been received (by the packet engine) from the requestor, an indication of whether the last part of the packet portion has been received (by the packet engine) from the requestor, and an indication of whether the entire packet portion has been communicated from the packet engine to a processing ME. When a PPI is de-allocated, the valid bit in the row for the PPI is cleared.

FIG. 29 is a diagram that illustrates operation of the Memory Allocation Table circuit (MAT) 288 in the packet engine 280 of the CTM 234 of FIG. 27. The circuit is not a table, but rather is circuitry that implements the table and the described table operations. As illustrated in FIG. 29, each row of the MAT circuit 288 has a field for indicating the "owner" of a "slice" of buffer space represented by the remaining eight bits, as well as the eight bits. The 2K byte slice is also referred to as a "buffer". Each of the eight bits represents one 256 byte portion of the 2K byte "buffer" in data cache SRAM 276. If a bit is set, then the corresponding 256 byte portion is allocated for use in storing the "packet portion" associated with a PPI allocated to the owner (the "owner" indicated by the first entry in the row). Each "buffer" can only be assigned to one "owner", but a buffer can store more than one packet portion of the same "owner".

As illustrated in FIG. 29, there are 128 such rows in the MAT circuit 288. When a requestor (for example, the DMA engine in ingress NBI-0) sends an "PPI allocation request" CPP command to the packet engine, the packet engine consults the MAT circuit, and more particularly examines any row whose indicated "owner" is the requestor that sent the PPI allocation request. If such a row is found, and if there are enough (adjacent) cleared bits in the row to indicate that the entire packet portion (the amount indicated in the "PPI allocation request") can be stored in contiguous available buffer space corresponding to the row, then the appropriate number of cleared bits are set to reflect that the packet portion will be stored in buffer space corresponding to these bits. If a row is not found that is "owned" by the requestor and that has adequate available storage space to accommodate the packet portion, then a row is chosen that is not get assigned to any owner. The owner of that row is set to be the requestor, and the appropriate number of adjacent bits are set according to the size of the packet portion. Regardless of whether a new row in the MAT is used, the row in the PAT circuit for the newly allocated PPI is updated so that the starting address logged in the PAT circuit for the PPI is the starting address of the first of the adjacent newly allocated 256 byte portion. When a PPI is de-allocated, the bits in the MAT circuit that were set (to reserve buffer space for use in storing the packet data associated with the PPI) are cleared.

FIG. 30 is a diagram of a "PPI allocation request" command 289 that the DMA engine in an ingress NBI island can send to the packet engine 280 in the CTM 234 in the ME island 203. FIG. 31 is a diagram that sets forth the contents of the various fields of the PPI allocation request command of FIG. 30. The "PPI allocation request" command 289 is a CPP bus command whose action field 293 and token field 294 contain particular codes that identify the bus transaction value as being a "PPI allocation request" command as opposed to another type of command. The values in the final destination field 290 and in the target ID field 292 identify the packet engine to which the PPI allocation request command is directed. A 2-bit value in the length field 295 indicates the size of the packet portion for which a PPI is being requested. The values of two bits of the address field 296, the value of the data master island field 297, and the value of the master ID field 298 identify the requestor device. The value of the data reference field 299 is supplied, as in other CPP commands, so that a response to the command can include the data reference value so that the response can be associated with the original command. In the case of the "PPI allocation request" command, the data reference value is included as part of the associated "PPI allocation response". In the table of FIG. 31, the notation [X;Y] indicates a field that is X bits long, starting at bit number Y. So, for example, the [2;0] notation in the table for the 2-bit "length of packet portion" code indicates that the code is two bits long, and that these two bits start at bit 0 of the 5-bit LENGTH field.

FIG. 32 is a diagram of a "PPI allocation response" bus transaction value 300 that the packet engine in the CTM in the ME island can send back in response to a "PPI allocation request" command. FIG. 33 is a diagram that illustrates various fields 301-307 of the PPI allocation response bus transaction value 300 of FIG. 32. The value of the data reference field 304 associates this response with a prior "PPI allocation request" command. The PPI value that is being communicated as having been allocated is indicated by the value in the PPI field 305. The PPI field is a 9-bit part of the 64-bit DATA field as set forth in FIG. 33. The values of the final destination field 301 and the master ID field 303 identify the original requestor to which the "PPI allocation response" is being sent. As explained above, a "PPI allocation response" can, in addition to setting forth a PPI that is being allocated, also set forth PPI credits to be returned to the requestor (due to completion of one or more prior allocate operations that were then de-allocated) and buffer credits to be returned to the requestor (due to completion of the prior allocate operations that were then de-allocated). The value of the PPI credit field 306 indicates a number of PPI credits being returned to the requestor. The value of the buffer credit field 307 indicates a number of buffer credits being returned to the requestor. When the requestor receives these credit values, the requestor adds the PPI credits being returned value to the PPI "credits available" register value maintained in the requestor, and the requestor adds the buffer credits being returned to the buffer "credits available" register value maintained in the requestor.

FIG. 34 is a diagram of a bus transaction value 308 that is usable to transfer data, where the bus transaction value 308 has a PAM/LAM mode selection field 313. FIG. 35 is a diagram that illustrates the fields of the bus transaction value of FIG. 34. The bus transaction value 308 is a CPP "autopush". The values of the final destination field 309 and the data master field 311 indicate the destination device to which the data is being sent. If the bit of PAM/LAM mode selection field 313 is set, then PPI addressing is employed and the PPI is carried in nine bits of the bus transaction value, where the first eight bits of the PPI are carried in the SIGNAL MASTER field as indicated in FIG. 35 and where the ninth bit of PPI is bit eleven of the 14-bit DATA REF field as indicated in FIG. 35. If, on the other hand, the bit of the PAM/LAM mode selection field 313 is cleared, then LAM addressing is employed and the address is carried in eight bits of the 14-bit DATA REF field, starting at bit three, as indicated in FIG. 35. In one example, multiple such "autopush" bus transaction values may be sent from the ingress NBI 209 to the packet engine 280 in order to communicate 2 k bytes the first 128 bytes of the packet portion. Each such "autopush" only transfers sixty-four bits (eight bytes) of data, so multiple such autopush bus transaction values are required to transfer the data.

An autopush bus transaction value 308 can also be directed to the packet engine 280. If the bit of the PAM/LAM mode selection field 313 is set, then the packet engine converts the PPI carried by the autopush into a memory address, and the data carried by the autopush is written into the data cache SRAM starting at this memory address. If the bit of the PAM/LAM mode selection field 313 is not set, then the address carried by the autopush is used to write the data into the data cache SRAM. In one example of the packet engine, PAM addressing can write into a first part of the data cache SRAM but not into a second part, whereas LAM addressing can write into the second part of the data cache SRAM but not into the first part. How the data cache SRAM is partitioned into these two parts is configurable via the control bus (CB).

FIG. 36 is a diagram of a "packet complete" command 315A that the processing ME in the ME island 203 can send to the packet engine 280 in the CTM 234 in ME island 203. FIG. 37 is a diagram that sets forth the contents of various fields 315-330 of the packet complete command 315A of FIG. 36. The action field 318 carries a particular 5-bit code that identifies the CPP command as a "packet complete" command. The values of the final destination field 315 and the target ID field 317 identify the target device to which the "packet complete" command is directed. In the present example, the target device is the packet engine 280. The value of the PPI field 320 indicates the PPI, the processing of whose corresponding packet portion is now indicated to have been completed. The value in the NBI NUM field 321 indicates the egress NBI to which the "packet complete" command should be forwarded by the packet engine.

FIG. 38 is a diagram of a PPI de-allocate command 322 that an egress NBI island can send back to the packet engine 280 in the ME island 203. FIG. 39 is a diagram that sets forth the contents of various fields of the PPI de-allocate command 322 of FIG. 38. The action field 326 and token field 327 carry a particular code that identifies the CPP command as a "de-allocate PPI" command. The PPI to be de-allocated is indicated by the value in the PPI field 328. As indicated in FIG. 39, the PPI field is the first nine bits of the 40-bit ADDRESS field. The particular CTM target to which the PPI de-allocate command is directed is indicated by the values in the final destination field 323 and in the target ID field 325. The device that sent the PPI de-allocate command is set forth by the values in the data master island field 329 and in the master ID field 330.

Figure 40A:
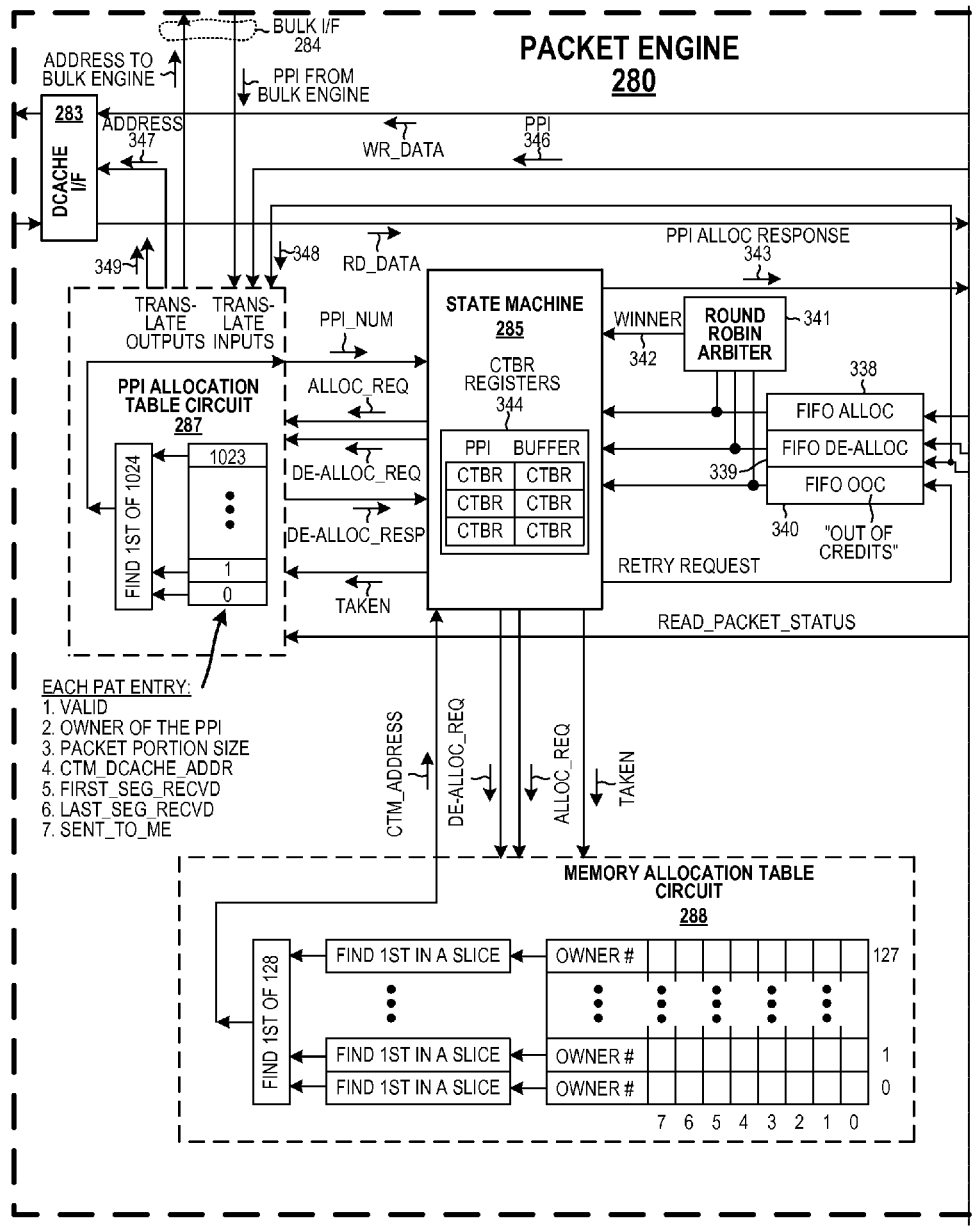
FIG. 40A is a part of a larger FIG. 40, where
Figure 41:
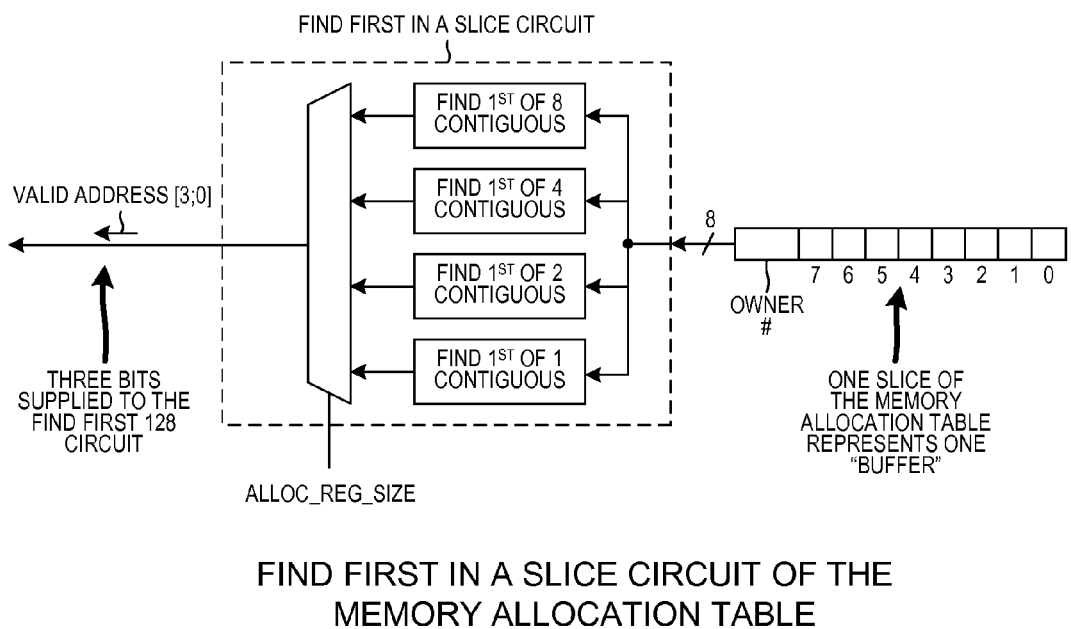
FIG. 41 is a diagram of one of the "find first in a slice" circuits of FIG. 40.

FIG. 40 is a conceptual block diagram of the circuitry of the packet engine 280 of the CTM 234 of FIG. 27. FIG. 41 is a more detailed diagram of one of the "find first in the slice" circuits in the MAT circuit 288 of FIG. 40. The circuitry of the "master interface circuit" block 281 in the diagram of FIG. 27 is the circuitry 332 and 333 in FIG. 40. The circuitry of the "target interface circuit" block 282 in the diagram of FIG. 27 is the circuitry 334 and 335 in FIG. 40. A "PPI allocation request" command is received by the T CMD portion of the data bus interface 236. The command is decoded by the command decoder 336, thereby causing the signals on conductors 337 to load a PPI allocation request into FIFO ALLOC 338. FIFO ALLOC 338 stores PPI allocation requests, whereas FIFO DE-ALLOC 339 stores PPI de-allocation requests. The round robin arbiter 341 arbitrates between the requests output from the FIFOs 338, 339 and 340, and through the WINNER signal on conductors 342 causes the state machine 285 to service one of the requests. In the case of the request being a PPI allocation request, the state machine 285 sends an allocation request signal ALLOC_REQ to the PAT circuit 287, and a PPI is received back from the PAT circuit 287 in the form of PAT_NUM (PPI). The state machine 285 also sends an allocation request signal ALLOC_REQ to the MAT circuit 288, and receives back a memory address CTM_ADDRESS. If the PAT and MAT circuits indicate that the PPI can be allocated, then the state machine 285 generates a PPI allocation response 343 and sends it to the CPP bus interface circuitry. The CPP bus interface circuitry handles transmitting a proper "PPI allocation response" onto the CPP data bus. In the event that a "PPI de-allocate" request command is received by the T CMD portion of the data bus interface 236, then this command is decoded by decoder 336 and a PPI de-allocate request is loaded into FIFO DE-ALLOC 339. After arbitration, the request is passed to the state machine 285, which in turn sends de-allocation requests to the PAT and MAT circuits.

In FIG. 40, reference numeral 344 identifies "Credits To Be Returned" (CTBR) registers that are maintained in the state machine 285. For each potential "owner" of a PPI, there is a PPI CTBR and a buffer CTBR. The PPI CTBR stores the number of PPI credits to be returned to the owner on the next PPI allocation response, and the buffer CTBR stores the number of buffer credits to be returned to the owner on the next PPI allocation response. In the case of a de-allocate request command coming through the state machine, one PPI is being de-allocated so the PPI CTBR value for the "owner" indicated by the PAT is incremented by one. Similarly, the MAT indicates whether a buffer has been made available (due to memory space no longer being necessary to store the packet portion associated with the de-allocated PPI), and this number of buffer credits (one or zero) is added to the buffer CTBR value for the "owner". The next time a PPI allocation response is sent to that owner, the CTBR values are included in the PPI allocation response. The CTBR values stored in the state machine for that owner are then zeroed. If a PPI allocation request passes out of arbiter 341 to the state machine 285, but if the PAT or MAT circuits indicate that a PPI allocation cannot be made, then either: 1) the PPI allocation request is recirculated for a later attempt by loading it into FIFO OOC 340, or 2) the failed PPI allocation request is signaled back to the requestor by setting an error code in the next PPI allocation response sent back to the requestor.

If the packet engine receives an "autopush" of the type set forth in FIG. 34 and FIG. 35, then the address and data to be pushed pass through multiplexing circuit 345. If PAM is selected as indicated by the PAM/LAM selection bit in the autopush bus transaction value, then the PPI 346 is supplied onto one of the translate inputs of the PAT circuit 287. The PAT circuit 287 translates the PPI into a memory address ADDRESS 347, which is supplied to the data cache interface 283. Because time is required to perform the PPI-to-address translation, the data to be written in the autopush is pipelined in FIFO 348 so that the data and address (for the autopush write to memory) is supplied to the data cache interface circuit 283 at the same time. The data cache interface circuit 283 uses the address and data to write the data into the data cache SRAM 276. The PAT circuit 287 performs PPI-to-address translation functions for the bulk engine 279 through bulk interface 284. The PAT circuit 287 also performs PPI-to-address translation functions for the DMA handler 286. Reference numeral 348 identifies a PPI value coming from the DMA handler, and reference numeral 349 identifies the returned address.

Reference numerals 390-392 and 395 identify first find and forwarding circuits. First find and forwarding circuit 390 identifies the first one of thirty-two requests from the ENTRY_0 to ENTRY_31 circuits and forwards the request to FIFO 393. Second find and forwarding circuit 391 identifies the first one of thirty-two requests from the ENTRY_0 to ENTRY_31 circuits and extracts a PPI from the request, and forwards the PPI to the PAT 287 for translation into a memory address, and receives a memory address in response, and forwards the memory address to the particular one of the ENTRY_0 to ENTRY_31 circuits. Third find and forwarding circuit 395 identifies the first one of thirty-two requests from the ENTRY_0 to ENTRY_31 circuits and forwards the request to the dcache memory via the dcache interface 283. Fourth find and forwarding circuit 392 identifies the first one of thirty-two requests from the ENTRY_0 to ENTRY_31 circuits and forwards the request to DMA master command FIFO 394.

Handling of a Merge Command:

Rather than the header portion (the first part) of a packet being stored in dcache memory in an ME island and the payload portion (the second part) of the packet being stored in either internal SRAM memory or external DRAM so that when the packet is to be output from the integrated circuit 150 the two parts of the packet can be combined in the egress NBI island as the packet is output, an exception situation is presented here where in fashion the entire packet is stored in external DRAM for some period of time. To facilitate carrying out the necessary move of packet data so that the entire packet will be stored together in external DRAM in this way, a novel "addressless merge command" is used. The novel merge command is issued by the DMA engine 267 and CPP master interface 450 of the egress NBI island 200 of FIG. 17. The novel merge command is sent from this CPP master across the CPP bus to a CPP target in the packet engine 280 in the CTM 234 in the ME island 203 (see FIG. 14). The header portion is stored in this CTM 234. As described above, such a merge command includes a PPI identifier value that identifies the packet data to be merged, but the merge command includes no memory address.

If such a merge command is received onto the target interface T CMD of the data bus interface 236 of the packet engine of FIG. 40, then the incoming merge command is decoded by decoder 336 and a corresponding DMA request (MEM_TO_INDIRECT_MODE) is generated and is supplied via conductors to FIFO 396. An available one of the "entry circuits" ENTRY_0 through ENTRY_31 receives and processes this DMA request when the DMA request comes out of FIFO 396. The state machine SM in the entry circuit causes the PPI value from the merge command to be supplied via circuit 391 and conductors 397 to the state machine 285 associated with the PAT circuit and MAT circuit. A PPI-to-address translation operation is performed as described above. After the PPI-to-address translation, the state machine 285 returns the corresponding address value (this address value indicates where the first part of the corresponding packet is stored in dcache memory 276 of FIG. 27) denoted here as DCACHE_ADD. This address value DCACHE_ADD is the ADR1 mentioned above that identifies the memory location in the internal memory (the dcache memory 276) where the first part of the packet and the descriptor are stored. This address ADR1 is returned from the dcache memory 276 via dcache interface 283 and conductors 398 and circuit 391 back to the entry circuit.

In response, the entry circuit sends this address value ADR1 to the dcache interface 283 via circuit 395 and conductors 399. The dcache memory 276 receives this address, uses the address to read the packet descriptor out of the dcache memory, and returns the packet descriptor to the entry circuit via conductors 400 and circuit 395. The packet descriptor (see FIG. 13) is the ingress packet descriptor for the packet identified by the PPI. From the packet descriptor, the entry circuit extracts the address value ADR2 indicating where the second part (payload portion) of the packet is stored in external DRAM memory. The entry circuit previously received the length value LENGTH from as a result of the PPI-to-address translation, where this LENGTH indicates the length of the first part (header portion and packet descriptor) of the packet to be moved.

The entry circuit then causes an appropriate number of CPP write commands to be output from the master interface of the CPP data bus interface 236 of the packet engine. These CPP write commands are sent one by one from the master interface of the packet engine to the target bulk mover engine in the external MU control island 206. The bulk mover engine in the external MU control island 206 is similar to the bulk mover engine 255 in the internal MU control island 205 depicted in FIG. 17, except that the external MU control island has no associated Data Cache SRAM, but rather is coupled to associated external DRAM. The entry circuit pushes each such CPP write command into the DMA master command FIFO 394. The CPP write command then passes via conductors 401 to the M CMD of the master CPP data bus interface 236.

For each such CPP write command, the target bulk mover engine in the external MU island 206 returns a pull-id bus transaction value. The pull-id bus transaction value passes across the pull-id mesh of the CPP bus back to the packet engine and is received onto the M PULL of the master CPP data bus interface 236. The pull-id bus transaction value is supplied via multiplexing circuit 345 to the dcache interface 283 and to the dcache memory 276. The data ref value of the pull-id bus transaction value is an address, and it is used to read the indicated data from the dcache memory 276. The indicated data as read out of the dcache memory 276 passes back to the packet engine, through the dcache interface 283, and is returned to the M PUSH of the master CPP data bus interface 236. The returned data then passes across the data mesh of the CPP bus back to the bulk mover engine in the external MU control island 206. The bulk mover in the external MU control island 206 receives the data and handles writing it into external DRAM starting at the address contained in the original CPP write command. Each such CPP write command results in the transfer of 128 bytes of data, so many such CPP write commands are typically sent through the DMA master command FIFO 394 to move the entire 2K bytes (the first part of the packet and the packet descriptor). For each successive CPP write command, the state machine in the entry circuit updates the dcache address (indicating from where in dcache 276 the data will be read) and updates the DRAM address (indicating where the data will be written into the external DRAM memory). These multiple data moves occur so that the first part of the packet and the descriptor are written into a vacant amount of memory space located immediately before the second part of the packet, so that when the multiple data moves are completed the first part of the packet, and packet descriptor, and the second part of the packet are left stored adjacent one another in the external DRAM in one contiguous block of memory locations.

Because it is the state machine of the entry circuit that generates and controls the issuing of the CPP write commands, the state machine is also aware of which one of the CPP write commands is the last of the sequence. For example, if there were sixteen CPP write commands issued, then the sixteenth responding pull-id bus transaction value must be the pull-id for the last CPP write command. The state machine detects the receipt of the pull-id bus transaction value for this last CPP write command when it is returned to the packet engine via the M PULL of the master interface, and in response to this detecting causes the data reference value of the original CPP merge command to be returned back to the master that originated the merge command. A bus transaction value (of the form set forth in FIG. 7) that includes the data reference value is sent via circuit 390, conductors 402, and FIFO 393 and out of the T PUSH of the target CPP data bus interface 236. This bus transaction value is then communicated across the data mesh of the CPP bus back to the master that originated the merge command, thereby signaling to the master that the merge command operation has been completed. The master that originated the merge command in this case is the DMA engine 267 and master interface 450 in the egress NBI island 200 of FIG. 17.

Figure 42:
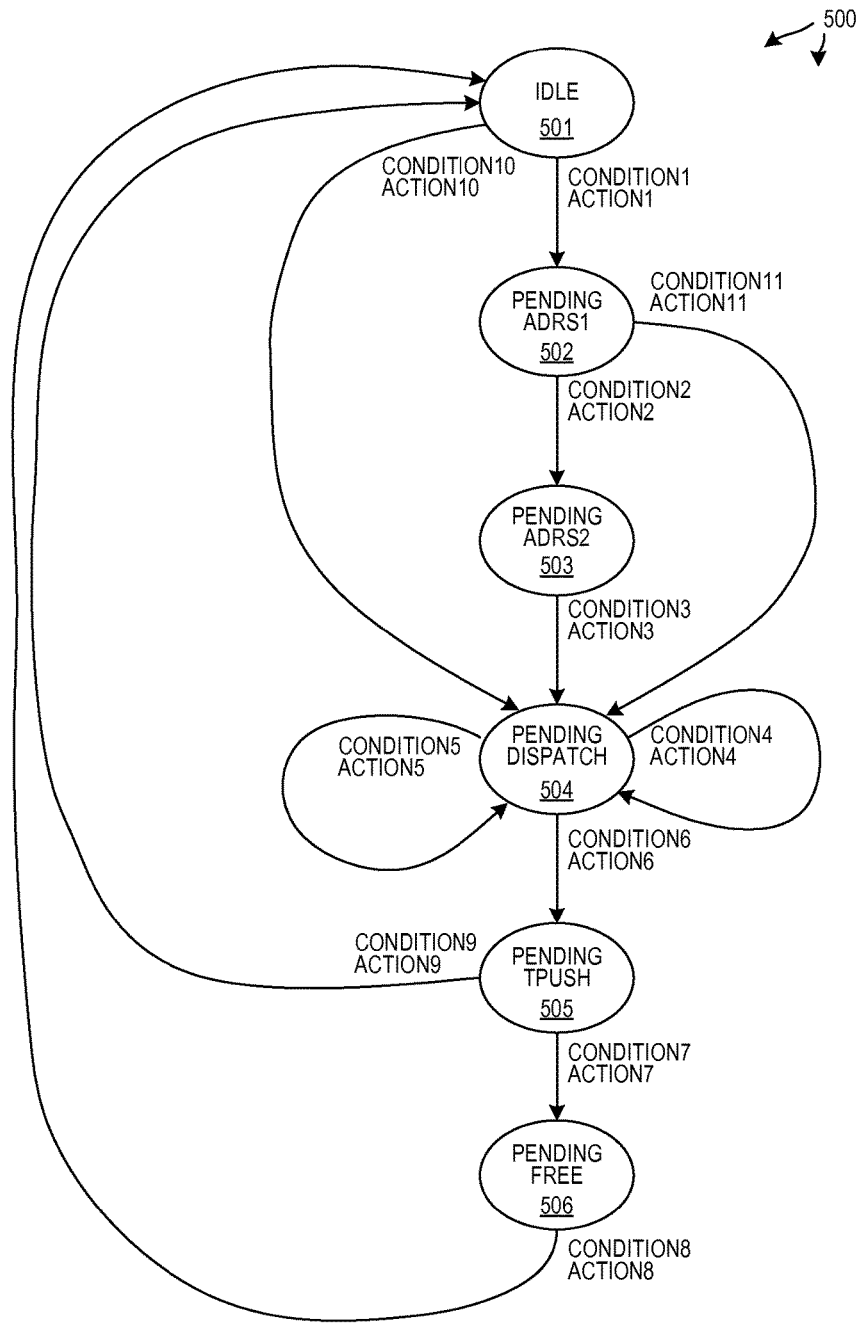
FIG. 42 is a state diagram for the state machine in one of the entries within the DMA resource handler 286 of FIG. 40.

FIG. 42 is a state diagram for the state machine in one of the entries (ENTRY_0 through ENTRY_31) of the DMA resource handler 286 of FIG. 40. All the state machines of the thirty-two entries are identical. State machine operation starts in the IDLE state 501. The other states are the PENDING_ADRS1 state 502, the PENDING_ADRS2 state 503, the PENDING_DISPATCH state 504, the PENDING_TPUSH state 505, and the PENDING_FREE state 506. Upon a given condition, the state machine transitions from operation in one state to operation in another state. In response to a condition and at the time of the transition, the state machine also performs an action. In the state diagram there is, for example, an arrow that extends from the PENDING_ADRS1 state 502 to the PENDING_ADRS2 state 503, and this arrow is labeled "CONDITION2

ACTION2". In the notation used in FIG. 42, this labeled arrow means that if the state machine is operating in the PENDING_ADRS1 state 502 and if the condition CONDITION2 then occurs, then the state machine: 1) performs the action ACTION2, and 2) transitions to the PENDING_ADRS2 state 503. The conditions and actions indicated on the state diagram of FIG. 42 are explained in further detail below.

Condition1 "Merge Command Received for PPI Mode or Indirect Mode": A merge command was received by the entry of which the state machine is a part. The merge command is in the PPI Mode or the Indirect Mode.

Action1 "Send PPI Info Request to PPI Allocation Table to get ADDR1": Send a PPI info request to the PPI Allocation Table to obtain the address (ADR1) at which first part of data is stored. This PPI info request will also return the size (LENGTH) of the first part of the data.

Condition2 "PPI Info Response containing ADR1 Received": The PPI info response was received from the PPI Allocation Table. This PPI response contains the address (ADR1) at which the first part of the data is stored as well as an indication of the size (LENGTH) of the first part of the data.

Action2 "Send request to Dcache Interface to read PPI Descriptor": Extract the address (ADR1) from the PPI info response. Also get the merge_command_length. Store the address (ADR1) obtained from the PPI info response in the entry. If the merge command is Indirect Mode, then send a request to the Dcache interface block to read the descriptor.

Condition3 "DCache Response containing PPI Descriptor Received": A response was received back from the Dcache interface block. The Dcache response contains the descriptor.

Action3 "Extract External Memory Address from PPI Descriptor": Extract the external memory address (ADR2) from the descriptor read from the DCache. Write commands are now ready to be dispatched.

Condition4 "Merge Command has non-zero length, and Master Command can be sent": The master command arbiter circuit can now accept a write command and the merge command has a non-zero length remaining.

Action4 "Send Master Command. Adjust merge_command_length and outstanding command count": Send the write command to the master command arbiter circuit. The entry_number is sent in the signal_ref field of the command. Increment the outstanding_commands_count. Decrement the merge_command_length. Continue to send master write commands, adjust the outstanding commands count, and the merge_command_length until the merge_command_length is 0 and the oustanding_commands_count is 0. If a master pull-id was simultaneously received with the entry_number in the signal_ref field, then decrement the outstanding commands count, because that write command is complete.

Condition5 "All commands dispatched—Received Pull-ID from Bulk Engine for outstanding command": All write commands have been sent, as indicated by merge_command_length being 0, but there are oustanding write commands, as indicated by outstanding_commands_count being non zero. A master pull-id was received with the entry_number in the signal_ref field in the data bus interface.

Action5 "Adjust outstanding command count": Decrement outstanding_commands_count, because receiving the entry_number on the signal_ref field of the master pull-id indicates command completion.

Condition6 "Outstanding command length count is 0 and merge_command_length is zero": All master write commands have been dispatched, as indicated by merge_command_length being 0, and there no oustanding commands, as indicated by oustanding_commands_count being 0.

Action6 "Send Target Push": Decrement oustanding_commands_count and send target push.

Condition7 "Target Push Request can be accepted by Target Push Interface and Merge Command wants to free PPI": A target push request can be accepted by the T_PUSH interface of the data bus interface. Also, the PPI is to be freed (de-allocated) at the end of execution of the merge command.

Action7 "Drive out target push to the Target Push Interface—Free the PPI": Drive out appropriate fields to the T_PUSH interface of the data bus interface. Send a de-allocate request to the PPI Allocation Table.

Condition8 "Free packet request can be accepted by the PPI Allocation Table": A de-allocate PPI request can be accepted by the PPI Allocation Table state machine.

Action8 "Drive out PPI Free Request": Output a de-allocate PPI request to the PPI Allocation Table.

Condition9 "Target Push Request can be accepted by Target Push Interface and Merge Command does not free PPI": A target push request can be accepted by the T_PUSH interface of the data bus interface.

Action9 "Drive out target push to the Target Push Interface": Drive out appropriate fields to the T_PUSH interface of the data bus interface. The data_ref field indicates merge command completion to the merge command master.

Condition10 "Merge Command Received for PPI Mode or Indirect Mode": A merge command was received by entry. The merge command is in PPI Mode or Indirect Mode.

Action10 "Send PPI Info Request to PPI Allocation Table to get ADDR1": Send a PPI info request to the PPI Allocation Table to read the address at which PPI is stored (ADR1). This will also return the size (LENGTH) of the first part of data.

Condition11 "PPI Info Response containing ADDR1 Received": A PPI info response was received from the PPI Allocation Table. This response contains the PPI Address (ADR1) and the size (LENGTH) of the first part of data.

Action11 "Send request to Dcache Interface to read PPI Descriptor": Extract from the PPI info response the address (ADR1) where first part of data is stored. Also get the merge_command_length. Store the address ADR1 obtained from the PPI info response in the entry.

In one example, in order to realize an integrated circuit embodiment of the packet engine 280 of FIG. 40, the function of each of the circuit blocks of the packet engine is described in a hardware description language (for example, CDL or Verilog or VHDL). A commercially available hardware synthesis program (for example, Synopsis Design Compiler) is then employed to generate digital logic circuitry from the hardware description language description, where the synthesized digital logic circuitry performs the functions described by the hardware description language. For additional detail on the packet engine 280 of FIG. 40, see: U.S. patent application Ser. No. 14/464,690, entitled "Packet Engine That Uses PPI Addressing", filed Aug. 20, 2014, by S alma Mirza et al. (all the subject matter of which is hereby incorporated by reference). The Ser. No. 14/464,690 patent application includes an amount of CDL hardware language description code for the state machine 285 of the packet engine 280 of FIG. 40.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
   (a) receiving a chained command onto a device from a bus, wherein the chained command includes a reference value;
   (b) in response to the receiving of the chained command in (a) outputting a plurality of commands onto the bus, wherein each of the commands causes a corresponding amount of data from a first portion of memory to be written into a second portion of memory, wherein due to the outputting of the plurality of commands the data is moved so that the data is stored in the second portion of memory, and wherein the chained command does not include any address; and
   (c) outputting the reference value from the device onto the bus, wherein (a) through (c) are performed by the device, and wherein the device includes no processor that fetches and executes processor-executable instructions.

2. The method of claim 1, wherein the bus is a Command/Push/Pull (CPP) bus, wherein the CPP bus has a set of command conductors, a set of pull-id conductors, and a set of data conductors, wherein the chained command in (a) is received onto the device via the set of command conductors, and wherein the reference value is output from the device in (c) via the set of data conductors.

3. The method of claim 1, wherein each of the commands output in (b) causes another device to write the corresponding amount of data into the second portion of memory.

4. The method of claim 1, wherein each of the commands output in (b) causes another device to read the corresponding amount of data from the first portion of memory and to write the corresponding amount of data into the second portion of memory.

5. The method of claim 1, wherein the plurality of commands in (b) are output onto the bus one by one in a sequence, and wherein one of the plurality of commands is a last command, and wherein the reference value is output in (c) after the last command in (b) has been output onto the bus.

6. The method of claim 1, wherein the chained command includes an identifier that identifies data to be moved.

7. The method of claim 1, wherein the device includes a state machine that controls the outputting of each of the commands in (b) and that detects when a write of the corresponding amount of data into the second portion of memory has been initiated.

8. The method of claim 1, wherein the device includes a state machine that controls the outputting of each of the commands in (b) and that detects when a move of the corresponding amount of data has been completed.

9. The method of claim 1, wherein the device includes a state machine that monitors how many commands have been output in (b) onto the bus.

10. The method of claim 1, wherein the device includes a target bus interface through which the chained command is received in (a) from the bus, and wherein the device includes a master bus interface through which the plurality of commands are output in (b) onto the bus.

11. The method of claim 1, wherein the each of the commands that is output in (b) onto the bus is a command to another device.

12. The method of claim 1, wherein the chained command does not include any memory address, wherein the chained command causes the device to obtain a memory address, and wherein the device uses the memory address to cause data to be read from the first portion of memory.

13. The method of claim 1, wherein the chained command does not include any memory address, wherein the chained command causes the device to obtain a memory address, and wherein the device uses the memory address to cause data to be written into the second portion of memory.

14. The method of claim 1, wherein the data is moved in (b) so that the data is stored in contiguous memory locations in the second portion of memory.

15. An apparatus comprising:
   a first portion of memory;
   a second portion of memory;
   a Command/Push/Pull (CPP) bus, wherein the CPP bus includes a set of command conductors, a set of pull-id conductors, and a set of data conductors; and
   means for: 1) receiving a chained command from the CPP bus via the command conductors, wherein the chained command includes a reference value, and wherein the chained command does not include any address, 2) in response to the receiving of the chained command outputting a plurality of commands onto the CPP bus, wherein each of the commands causes a corresponding amount of data from the first portion of memory to be written into the second portion of memory, wherein due to the outputting of the plurality of commands the data is moved so that the data is stored in the second portion of memory, and 3) outputting the reference value onto the data conductors of the CPP bus, wherein the means includes no processor that fetches and executes processor-executable instructions, and wherein the chained command includes an identifier that identifies data to be moved.

16. The apparatus of claim 15, wherein the means comprises a state machine, a command decoder, a CPP bus target interface, and a CPP bus master interface.

17. The apparatus of claim 15, wherein the means receives the chained command via the set of command conductors of the CPP bus, and wherein means outputs the reference value onto the data conductors of the CPP bus.

18. The apparatus of claim 15, wherein the outputting of the plurality of commands by the means causes the data to be moved across the CPP bus from the first portion of memory to the second portion of memory.

19. The apparatus of claim 15, wherein the means is also for controlling the outputting of each of the commands and for detecting when a write of the corresponding amount of data into the second portion of memory has been initiated.

20. The apparatus of claim 15, wherein the means is also for controlling the outputting of each of the commands and for detecting when a write of the corresponding amount of data into the second portion of memory has been completed.

* * * * *